United States Patent
Dalrymple et al.

(10) Patent No.: US 8,703,659 B2
(45) Date of Patent: Apr. 22, 2014

(54) SEALANT COMPOSITION COMPRISING A GEL SYSTEM AND A REDUCED AMOUNT OF CEMENT FOR A PERMEABLE ZONE DOWNHOLE

(75) Inventors: Eldon D. Dalrymple, Duncan, OK (US);
Larry S. Eoff, Duncan, OK (US);
Diederik W. van Batenburg, Delft (NL); Jip van Eijden, Rijswijk (NL)

(73) Assignee: Halliburton Energy Services, Inc., Houston, TX (US)

( * ) Notice: Subject to any disclaimer, the term of this patent is extended or adjusted under 35 U.S.C. 154(b) by 1462 days.

(21) Appl. No.: 11/335,134

(22) Filed: Jan. 19, 2006

(65) Prior Publication Data

US 2006/0234871 A1    Oct. 19, 2006

Related U.S. Application Data

(63) Continuation-in-part of application No. 11/041,577, filed on Jan. 24, 2005, now Pat. No. 7,267,174, and a continuation-in-part of application No. 11/041,554, filed on Jan. 24, 2005, now abandoned.

(60) Provisional application No. 60/752,132, filed on Dec. 20, 2005.

(51) Int. Cl.
*C09K 8/508* (2006.01)
*E21B 33/138* (2006.01)

(52) U.S. Cl.
USPC ........... 507/219; 507/211; 507/222; 507/224; 507/225; 507/269; 166/293; 166/295; 166/300; 106/802; 106/808; 106/809

(58) Field of Classification Search
None
See application file for complete search history.

(56) References Cited

U.S. PATENT DOCUMENTS

| | | | | |
|---|---|---|---|---|
| 2,576,955 A | * | 12/1951 | Ludwig | 524/5 |
| 2,805,719 A | | 9/1957 | Anderson | |
| 3,414,420 A | * | 12/1968 | Maravilla et al. | 106/720 |
| 3,417,017 A | * | 12/1968 | Kolaian et al. | 507/111 |
| 3,493,561 A | * | 2/1970 | Park et al. | 536/105 |
| 3,548,944 A | | 12/1970 | Hess | |
| 3,709,298 A | | 1/1973 | Pramann | |
| 3,757,862 A | | 9/1973 | Kern et al. | |
| 3,759,327 A | | 9/1973 | Carnes | |
| 3,776,311 A | | 12/1973 | Carnes et al. | |
| 3,793,244 A | | 2/1974 | Megee | |
| 3,835,926 A | | 9/1974 | Clement, Jr. | |
| 3,928,052 A | | 12/1975 | Clement, Jr. | |

(Continued)

FOREIGN PATENT DOCUMENTS

| | | |
|---|---|---|
| DE | 2652045 A | 5/1978 |
| EP | 0145151 A1 | 6/1985 |

(Continued)

OTHER PUBLICATIONS

Office Action (Final) dated Dec. 18, 2008 (21 pages), U.S. Appl. No. 11/041,554, filed Jan. 24, 2005.

(Continued)

*Primary Examiner* — John J Figueroa
(74) *Attorney, Agent, or Firm* — Holly Soehnge; Conley Rose, P.C.

(57) ABSTRACT

A sealant composition for servicing a wellbore comprising at least one gel system, a leak off prevention material and water.

19 Claims, 2 Drawing Sheets

(56) References Cited

U.S. PATENT DOCUMENTS

| | | | |
|---|---|---|---|
| 3,960,801 A | 6/1976 | Cole et al. |
| 3,967,681 A | 7/1976 | Curzon |
| 3,976,135 A | 8/1976 | Anderson |
| 4,015,995 A | 4/1977 | Hess |
| 4,034,811 A | 7/1977 | Sparlin et al. |
| 4,042,032 A | 8/1977 | Anderson et al. |
| 4,043,921 A * | 8/1977 | Hessert et al. | 507/113 |
| 4,072,194 A | 2/1978 | Cole et al. |
| 4,371,648 A | 2/1983 | Gardikes et al. |
| 4,393,939 A | 7/1983 | Smith et al. |
| 4,480,693 A | 11/1984 | Newlove et al. |
| 4,489,785 A | 12/1984 | Cole |
| 4,512,407 A | 4/1985 | Friedman |
| 4,515,635 A | 5/1985 | Rao et al. |
| 4,537,918 A | 8/1985 | Parcevaux et al. |
| 4,555,269 A | 11/1985 | Rao et al. |
| 4,557,763 A | 12/1985 | George et al. |
| 4,582,139 A | 4/1986 | Childs et al. |
| 4,629,747 A | 12/1986 | Wu et al. |
| 4,643,255 A * | 2/1987 | Sandiford et al. | 166/295 |
| 4,683,949 A | 8/1987 | Sydansk et al. |
| 4,706,755 A * | 11/1987 | Roark et al. | 166/295 |
| 4,721,160 A | 1/1988 | Parceavux et al. |
| 4,749,592 A | 6/1988 | Gasper et al. |
| 4,761,183 A | 8/1988 | Clarke |
| 4,767,460 A | 8/1988 | Parcevaux et al. |
| 4,861,822 A | 8/1989 | Keskey et al. |
| 4,935,060 A * | 6/1990 | Dingsoyr | 106/719 |
| 4,997,487 A * | 3/1991 | Vinson et al. | 106/804 |
| 5,086,850 A | 2/1992 | Harris et al. |
| 5,121,795 A | 6/1992 | Ewert et al. |
| 5,123,487 A | 6/1992 | Harris et al. |
| 5,125,455 A | 6/1992 | Harris et al. |
| 5,127,473 A | 7/1992 | Harris et al. |
| 5,134,118 A * | 7/1992 | Patel et al. | 507/121 |
| 5,146,986 A | 9/1992 | Dalrumple |
| 5,159,980 A | 11/1992 | Onan et al. |
| 5,181,568 A | 1/1993 | McKown et al. |
| 5,238,064 A | 8/1993 | Dahl et al. |
| 5,284,512 A | 2/1994 | Koskan et al. |
| 5,293,938 A | 3/1994 | Onan et al. |
| 5,296,627 A | 3/1994 | Tang et al. |
| 5,325,922 A * | 7/1994 | Cowan et al. | 166/293 |
| 5,332,037 A | 7/1994 | Schmidt et al. |
| 5,335,726 A | 8/1994 | Rodrigues |
| 5,337,824 A * | 8/1994 | Cowan | 166/293 |
| 5,338,726 A | 8/1994 | Shiosaki et al. |
| 5,340,860 A * | 8/1994 | Brake et al. | 524/166 |
| 5,358,044 A * | 10/1994 | Hale et al. | 166/293 |
| 5,358,051 A | 10/1994 | Rodrigues |
| 5,377,757 A | 1/1995 | Ng |
| 5,411,093 A * | 5/1995 | Jennings, Jr. | 166/300 |
| 5,443,123 A | 8/1995 | Wall et al. |
| 5,563,201 A | 10/1996 | Joanicot et al. |
| 5,587,034 A | 12/1996 | Ma |
| 5,588,488 A | 12/1996 | Vijn et al. |
| 5,663,123 A * | 9/1997 | Goodhue et al. | 507/225 |
| 5,688,844 A | 11/1997 | Chatterji et al. |
| 5,709,821 A | 1/1998 | von Bonin et al. |
| 5,712,314 A | 1/1998 | Surles et al. |
| 5,779,787 A | 7/1998 | Brothers et al. |
| 5,791,415 A | 8/1998 | Nguyen et al. |
| 5,836,392 A | 11/1998 | Urlwin-Smith |
| 5,839,510 A | 11/1998 | Weaver et al. |
| 5,845,845 A | 12/1998 | Merke et al. |
| 5,850,880 A | 12/1998 | Moran et al. |
| 5,875,845 A | 3/1999 | Chatterji et al. |
| 5,875,846 A | 3/1999 | Chatterji et al. |
| 5,900,451 A | 5/1999 | Krishnan et al. |
| 5,913,364 A | 6/1999 | Sweatman |
| 5,924,488 A | 7/1999 | Nguyen et al. |
| 5,944,105 A | 8/1999 | Nguyen |
| 5,945,387 A | 8/1999 | Chatterji et al. |
| 5,948,344 A | 9/1999 | Cusick et al. |
| 5,960,880 A | 10/1999 | Nguyen et al. |
| 6,003,600 A | 12/1999 | Nguyen et al. |
| 6,006,836 A | 12/1999 | Chatterji et al. |
| 6,016,871 A * | 1/2000 | Burts, Jr. | 166/300 |
| 6,047,772 A | 4/2000 | Weaver et al. |
| 6,060,434 A | 5/2000 | Sweatman et al. |
| 6,098,711 A | 8/2000 | Chatterji et al. |
| 6,130,287 A | 10/2000 | Krishnan |
| 6,167,967 B1 | 1/2001 | Sweatman |
| 6,176,315 B1 | 1/2001 | Reddy et al. |
| 6,177,484 B1 | 1/2001 | Surles |
| 6,180,571 B1 * | 1/2001 | Sifferman et al. | 507/110 |
| 6,182,758 B1 | 2/2001 | Vijn |
| 6,187,839 B1 | 2/2001 | Eoff et al. |
| 6,192,986 B1 * | 2/2001 | Urlwin-Smith | 166/295 |
| 6,196,317 B1 | 3/2001 | Hardy |
| 6,209,643 B1 | 4/2001 | Nguyen et al. |
| 6,210,476 B1 | 4/2001 | Chatterji et al. |
| 6,216,783 B1 * | 4/2001 | Hocking et al. | 166/250.1 |
| 6,218,343 B1 | 4/2001 | Burts, Jr. |
| 6,257,335 B1 | 7/2001 | Nguyen et al. |
| 6,258,757 B1 | 7/2001 | Sweatman et al. |
| 6,302,207 B1 | 10/2001 | Nguyen et al. |
| 6,310,008 B1 | 10/2001 | Rietjens |
| 6,312,515 B1 | 11/2001 | Barlet-Gouedard et al. |
| 6,321,841 B1 | 11/2001 | Eoff et al. |
| 6,367,549 B1 | 4/2002 | Chatterji et al. |
| 6,419,016 B1 | 7/2002 | Reddy |
| 6,457,524 B1 | 10/2002 | Roddy |
| 6,497,283 B1 | 12/2002 | Eoff et al. |
| 6,508,306 B1 | 1/2003 | Reddy et al. |
| 6,516,883 B1 | 2/2003 | Chatterji et al. |
| 6,590,050 B1 | 7/2003 | Bair et al. |
| 6,607,035 B1 | 8/2003 | Reddy et al. |
| 6,626,992 B2 | 9/2003 | Vijn et al. |
| 6,656,266 B1 | 12/2003 | Barlet-Gouedard et al. |
| 6,664,215 B1 | 12/2003 | Tomlinson |
| 6,667,279 B1 * | 12/2003 | Hessert et al. | 507/225 |
| 6,702,021 B1 | 3/2004 | Nguyen et al. |
| 6,702,044 B2 | 3/2004 | Reddy et al. |
| 6,722,433 B2 | 4/2004 | Brothers et al. |
| 6,743,288 B2 | 6/2004 | Eoff et al. |
| 6,764,981 B1 | 7/2004 | Eoff et al. |
| 6,766,858 B2 | 7/2004 | Nguyen et al. |
| 6,770,604 B2 | 8/2004 | Reddy et al. |
| 6,776,236 B1 | 8/2004 | Nguyen |
| 6,822,061 B2 | 11/2004 | Eoff et al. |
| 6,823,940 B2 | 11/2004 | Reddy et al. |
| 6,837,316 B2 | 1/2005 | Reddy et al. |
| 6,843,841 B2 | 1/2005 | Reddy et al. |
| 6,936,574 B2 | 8/2005 | Dao et al. |
| 6,951,250 B2 | 10/2005 | Reddy et al. |
| 7,114,570 B2 | 10/2006 | Nguyen et al. |
| 7,131,493 B2 | 11/2006 | Eoff et al. |
| 7,267,174 B2 | 9/2007 | Gonsveld et al. |
| 2003/0213593 A1 | 11/2003 | Bouwmeester et al. |
| 2003/0224946 A1 | 12/2003 | Verlaan et al. |
| 2003/0230407 A1 * | 12/2003 | Vijn et al. | 166/292 |
| 2004/0020650 A1 | 2/2004 | Burts, III |
| 2004/0023813 A1 | 2/2004 | Burts, III |
| 2004/0035580 A1 | 2/2004 | Bouwmeester et al. |
| 2004/0177964 A1 * | 9/2004 | Girgenti | 166/294 |
| 2004/0182576 A1 | 9/2004 | Reddy et al. |
| 2004/0206502 A1 * | 10/2004 | Reddy et al. | 166/293 |
| 2005/0124501 A1 | 6/2005 | Reddy et al. |
| 2005/0167106 A1 | 8/2005 | Reddy et al. |
| 2005/0197257 A1 | 9/2005 | Bouwmeester |
| 2005/0230112 A1 | 10/2005 | Reddy et al. |
| 2005/0230113 A1 | 10/2005 | Eoff et al. |
| 2005/0288190 A1 | 12/2005 | Dao et al. |
| 2006/0086503 A1 | 4/2006 | Reddy et al. |
| 2006/0122071 A1 | 6/2006 | Reddy et al. |
| 2006/0167133 A1 | 7/2006 | Gromsveld et al. |

FOREIGN PATENT DOCUMENTS

| | | | |
|---|---|---|---|
| EP | 0 566 118 B2 | 10/2001 | |
| EP | 1201874 A2 | 5/2002 | |
| EP | 1369401 A2 | 12/2003 | |
| EP | 1 394 353 A2 | 3/2004 | E21B 33/13 |

(56) References Cited

FOREIGN PATENT DOCUMENTS

| EP | 1 457 639 | 9/2004 | ............ E21B 33/138 |
|---|---|---|---|
| EP | 1457639 A1 | 9/2004 | |
| GB | 2296713 A | 7/1996 | |
| WO | 9902464 A1 | 1/1999 | |
| WO | WO 00/36269 | 6/2000 | ............. E21B 43/02 |
| WO | WO 2005/078235 A1 | 8/2005 | |
| WO | 2005100739 A1 | 10/2005 | |
| WO | 2006077374 A1 | 7/2006 | |
| WO | 2007085983 A1 | 8/2007 | |
| WO | 2008096165 A1 | 8/2008 | |

OTHER PUBLICATIONS

Foreign Communication from a counterpart application-International Search Report and Written Opinion, PCT/GB2006/000001, May 29, 2006, 8 pages.
Foreign Communication from a counterpart application-International Search Report, PCT/GB2007/000135, May 2, 2007, 3 pages.
Office Action dated Jan. 10, 2007 (17 pages), U.S. Appl. No. 11/041,577, filed Jan. 24, 2005.
Office Action dated Jun. 28, 2007 (22 pages), U.S. Appl. No. 11/041,554, filed Jan. 24, 2005.
Final Office Action dated Oct. 25, 2007 (12 pages), U.S. Appl. No. 11/041,554, filed Jan. 24, 2005.
Notice of Allowance dated Jun. 20, 2007 (6 pages), U.S. Appl. No. 11/041,577, filed Jan. 24, 2005.
Supplemental Notice of Allowability dated Jul. 16, 2007 (4 pages), U.S. Appl. No. 11/041,577, filed Jan. 24, 2005.
Patent application entitled "Methods and Compositions for Reducing Subterranean Formation Permeabilities" by Bach Dao, et al., filed Jun. 24, 2004, U.S. Appl. No. 10/875,649.
International Preliminary Report on Patentability dated Jul. 24, 2007 (7 pgs), for International Application No. PCT/GB2006/000001.
Halliburton brochure entitled "Halad®-344 Fluid-Loss Additive" dated 1998.
Halliburton brochure entitled "Latex 2000 Cement Additive" dated 1998.
Halliburton brochure entitled "MICROSAND Cement Additive" dated 1999.
Halliburton brochure entitled "The PermSeal™ System—Versatile, Cost-Effective Sealants for Conformance Applications" dated 2002.
Halliburton brochure entitled "SSA-1 Strength Stabilizing Agent" dated 1998.
Halliburton brochure entitled "SSA-2 Coars Silica Flour" dated 1999.
Ewert, D.P. et al., "Small-Particle-Size Cement" dated 1991.
American Petroleum Institute, "Specification for Materials and Testing for Well Cements," API Specification , Fifth Edition, Jul. 1, 1990.
Foreign Search Report and Written Opinion for International Application No. PCT/GB2005/005095, Dec. 30, 2005.
Office Action dated Mar. 5, 2008 (10 pages), U.S. Appl. No. 11041,544, filed Jan. 24, 2005.
3M brochure entitled "Microspheres," Sep. 2000, 6 pages, 3M.
3M brochure entitled "Scotchlite(TM) glass bubbles," Jul. 1999, 8 pages, 3M.
3M brochure entitled "Specialty materials for the oil & gas industry," 2001, 12 pages, 3M.
Advisory Action dated Jan. 11, 2008 (6 pages), U.S. Appl. No. 11/041,554, filed Jan. 24, 2005.
Advisory Action dated Jan. 17, 2008 (3 pages), U.S. Appl. No. 11/041,554, filed Jan. 24, 2005.
Advisory Action dated Jan. 24, 2008 (7 page), U.S. Appl. No. 11/035,299, filed Jan. 13, 2005.
Foreign communication from a related counterpart application—International Search Report and Written Opinion, PCT/GB2004/001645, Aug. 30, 2004, 8 pages.
Office Action dated Sep. 7, 2004 (12 pages), U.S. Appl. No. 10/436,655, filed May 13, 2003.
Office Action dated Feb. 25, 2005 (10 pages), U.S. Appl. No. 10/436,655, filed May 13, 2003.
Office Action dated Jul. 18, 2007 (19 pages), U.S. Appl. No. 11/035,299, filed Jan. 13, 2005.
Office Action (Final) dated Nov. 21, 2007 (9 pages), U.S. Appl. No. 11/035,299, filed Jan. 13, 2005.
Office Action dated Mar. 6, 2008 (11 pages), U.S. Appl. No. 11/035,299, filed Jan. 13, 2005.
Office Action (Final) dated Aug. 1, 2008 (29 pages), U.S. Appl. No. 11/035,299, filed Jan. 13, 2005.
Office Action (Final) dated Aug. 13, 2008 (21 pages), U.S. Appl. No. 11/041,554, filed Jan. 24, 2005.
Notice of Allowance dated Jun. 8, 2005 (4 pages), U.S. Appl. No. 10/436,655, filed May 13, 2003.
Office Action dated Nov. 3, 2008 (21 pages), U.S. Appl. No. 11/035,299, filed Jan. 13, 2005.
Office Action dated Mar. 3, 2009 (23 pages), U.S. Appl. No. 11/041,554, filed Jan. 24, 2005.
Office Action dated Apr. 28, 2009 (19 pages), U.S. Appl. No. 11/035,299, filed Jan. 13, 2005.
Office Action (Final) dated Jul. 13, 2009 (29 pages), U.S. Appl. No. 11/041,554, filed Jan. 24, 2005.
Advisory Action dated Aug. 24, 2009 (4 pages), U.S. Appl. No. 11/041,554, filed Jan. 24, 2005.
Notice of Allowance dated Dec. 16, 2009 (9 pages), U.S. Appl. No. 11/035,299, filed Jan. 13, 2005.
Examiner's Answer dated Mar. 24, 2010 (29 pages), U.S. Appl. No. 11/041,554, filed Jan. 24, 2005.
Foreign communication from a related counterpart application-Malaysian Examination Report, PI 20071212, Aug. 30, 2010, 3 pages.
Foreign communication from a related counterpart application-International Search Report and Written Opinion, PCT/US2010/050902, Nov. 10, 2010, 12 pages.
Navarrete, R. C., et al., "New bio-polymers for drilling, drill-in, completions, spacer fluids and coiled tubing applications," XP-002607369, IADC/SPE 62790, 2000, pp. 1-17, IADC/SPE Asia Pacific Drilling Technology.
Office Action (Final) dated Oct. 6, 2009 (13 pages), U.S. Appl. No. 11/035,299, filed Jan. 13, 2005.

* cited by examiner

SEALANT COMPOSITION COMPRISING A GEL SYSTEM AND A REDUCED AMOUNT OF CEMENT FOR A PERMEABLE ZONE DOWNHOLE

CROSS-REFERENCE TO RELATED APPLICATIONS

This application is a Continuation-In-Part of copending U.S. patent application Ser. No. 11/041,577 filed Jan. 24, 2005 and entitled "Methods of Plugging a Permeable Zone Downhole Using a Sealant Composition Comprising a Crosslinkable Material and a Reduced Amount of Cement" and Ser. No. 11/041,554 filed Jan. 24, 2005 and entitled "A Sealant Composition Comprising a Crosslinkable Material and a Reduced Amount of Cement for a Permeable Zone Downhole," which are incorporated herein by reference in their entirety. The present application also claims priority to U.S. Provisional Application Ser. No. 60/752,132 filed Dec. 20, 2005 and entitled "A Sealant Composition Comprising a Gel System and a Reduced Amount of Cement for a Permeable Zone Downhole," which is incorporated by reference.

FIELD OF THE INVENTION

The present invention generally relates to subterranean zonal isolation, and more particularly to methods of plugging a permeable zone in a wellbore using a sealant composition comprising one or more gel systems, a leak prevention material, water, and optionally a fluid loss control additive.

BACKGROUND OF THE INVENTION

A technique known as squeeze or remedial cementing is a common operation in the petroleum industry. Most squeezes are performed with a drilling or workover rig and through threaded tubing or drillpipe. Squeeze cementing is most often performed to repair leaks in well tubulars and restore pressure integrity to the wellbore, raise the level of or restore a cement sheath behind the casing to support or protect well tubulars, modify the production or injection profile of a well by sealing unwanted production (e.g., perforations) or thief zones, or repair a poor primary cement job before well completion. Squeeze cementing coupled with coiled tubing has been a standard remediation technique for shutting of unwanted gas or water production. Cement is able to fill perforation tunnels, channels behind pipe, and/or washout zones behind pipe, and consequently cement is able to provide a near wellbore block to production. Production from selected zones can then be reestablished by reperforating these zones. Unfortunately, cement has limitations as it does not penetrate into the porous rock, but rather fills and plugs voids, perforations, etc. as noted previously. As a result, microchannels along the cement and porous rock interface often develop due to cyclical changes in underground pressures and temperatures during subsequent production and shut-in stages.

Polymer gels or gel systems are also used for shutting of unwanted gas or water production and can be placed by bullheading or can be selectively placed through coiled tubing. The main difference from squeeze cementing is that the polymer gels provide in depth blockage of the formation by penetrating the porous media and crosslinking in situ therein. The in situ properties of these gels can be varied from flowing gels to ringing gels by adjusting the polymer concentration, the polymer molecular weight, and/or the type of crosslinker. A limitation of gels is that they may not have the mechanical properties to provide sufficient resistance to flow in the absence of a porous medium, for example in areas such as voids and cavities behind pipe.

A logical solution to the limitations outlined above is to combine polymer gels with cement squeezes to effectively block production through the porous medium, perforations, voids and/or cavities. This combination is typically conducted sequentially: first the polymer gel is placed in the formation and the treatment is completed with a cement tail-in to squeeze the perforations and any voids and cavities behind pipe. A disadvantage of the sequential combination treatment may be that the depth of polymer invasion in the porous media extends beyond the depths that can be penetrated by perforating guns and consequently the shut-off may be permanent.

Another approach to combining squeeze cementing and polymer gel technology for shutting of unwanted gas or water production is to use the polymer gel as the "mix water" for the cement slurry. The limited and controlled leak off of the polymer gel into the porous medium during the squeeze enables a controlled depth of invasion. U.S. Published Application No. 2003/0224946 A1, incorporated herein by reference in its entirety, discloses compositions that can be used for this combined gel-cement technique. One composition includes a crosslinkable material, e.g., $H_2$ZERO polymer sold by Halliburton Energy Services of Duncan, Okla., for improving the strength of the composition when it sets such that it can withstand the pressures exerted by fluids in the subterranean formation. However, due to the alkalinity of the cement, which typically has a pH greater than 12, the gel time of the cement composition at the relatively high temperatures in the wellbore may be unacceptably short. The gel time refers to the period of time from initial mixing of the components in the cement composition to the point when a gel is formed. At this point, the viscosity of the cement composition is so high that it is no longer pumpable and thus does not reach the permeable zone where its placement is intended. A need therefore exists to control the gel time of such squeeze sealant compositions, thus ensuring that they can be properly placed in permeable zones downhole to prevent fluids from flowing into the wellbore. Furthermore, an ongoing need exists for improved gel systems and combined gel-cement techniques that limit leak off into the surrounding formation.

SUMMARY OF THE INVENTION

Disclosed herein is a sealant composition for servicing a wellbore comprising at least one gel system, a leak off prevention material and water.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DETAILED DESCRIPTION OF THE PREFERRED EMBODIMENTS

Figure 1:
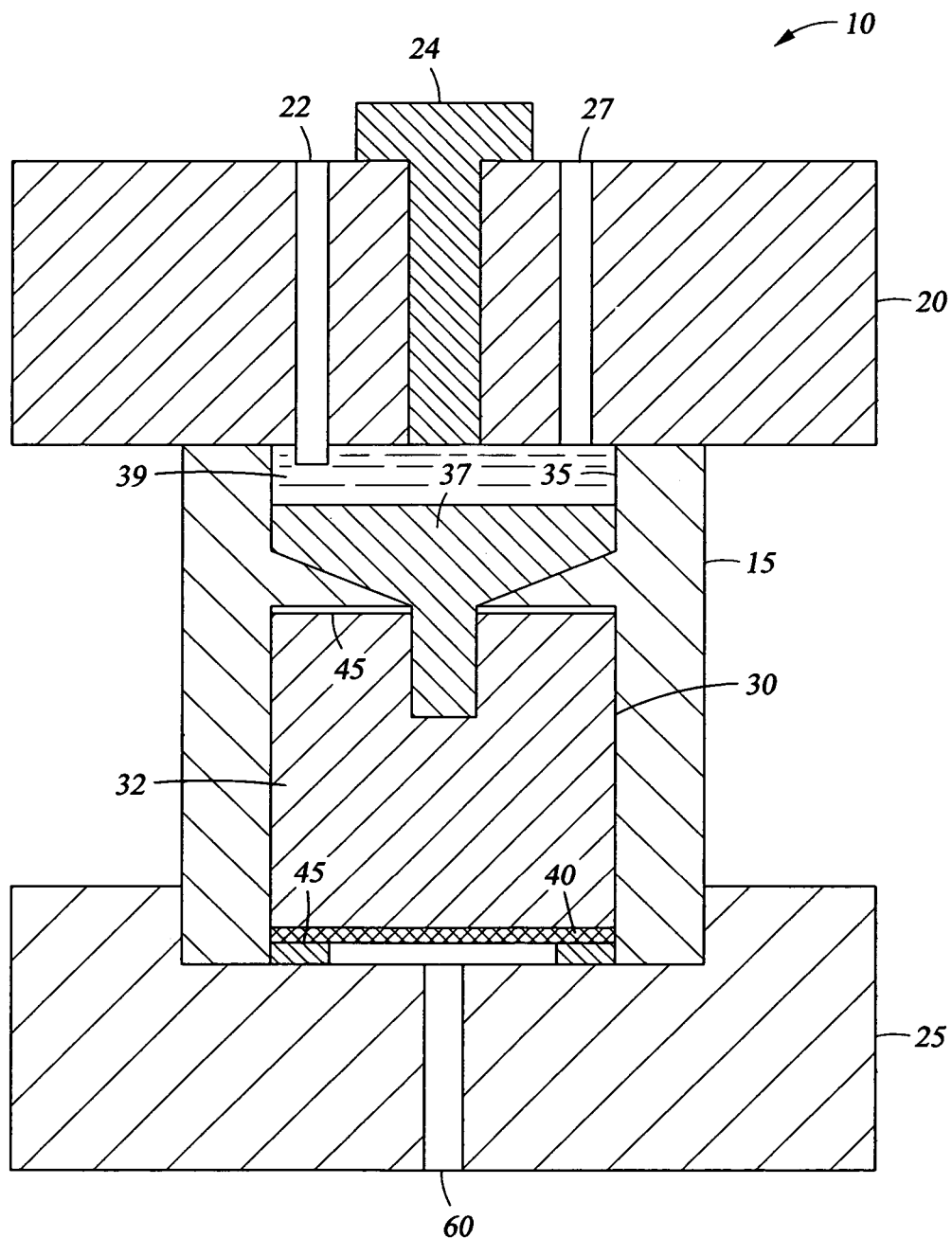
FIG. 1 is a schematic diagram of a stainless steel test cell used in the Examples.

Sealant compositions for plugging permeable zones in a wellbore include at least one gel system, a leak off prevention material (LPM), water, and optionally a fluid loss control additive. The LPM may function to control leak off of the gel into the formation. The LPM may be a particulate material (e.g., cement, silica flour), a water-soluble material (e.g. starch, hydrophobically modified polymers) or combinations thereof. In various embodiments, the LPM may comprise cement alone or in combination with other particulate material. In an embodiment, the LPM comprises a reduced amount of cement relative to an otherwise similar conventional cement composition, for example a cement composition disclosed in U.S. Patent Application Publication No. 2003/0224946 A1, filed Jun. 4, 2002, and incorporated by reference herein in its entirety. In an embodiment, the LPM does not comprise cement, and thus cementless sealant compositions are contemplated wherein LPM other than cement is used to control the leak off of polymer gel into the formation.

The sealant compositions comprise an effective amount of LPM to prevent leak off of the polymer gel into the formation beyond a desired depth, for example beyond the effective perforation depth. Furthermore, the amount of crosslinker or activator in a gel system may be adjusted to lengthen the gel time of the sealant compositions to greater than or equal to about 4 hours when the composition is exposed to ambient temperatures in the wellbore. In an embodiment, the gel time is in a range of from about 4 hours to about 12 hours, alternatively, from about 4 to about 8 hours, alternatively, from about 4 to about 6 hours. In particular, the amount of cement when present in the sealant compositions may be in a range of from about 0% to about 50% by weight of the sealant composition. As used herein, gel time is defined as the period of time from initial mixing of the components in the sealant composition to the point when a gel is formed. Further, as used herein, a gel is defined as a crosslinked polymer network in a liquid medium. A gel system, as the term is used herein, generally includes gelling components of a sealant composition other than the LPM (e.g., cement). In embodiments, the various gel systems described herein may be used alone or in combination with one another in the sealant composition.

In an embodiment, the sealant composition may include a gel system comprising one or more crosslinkable materials. Examples of suitable crosslinkable materials include, but are not limited to, the following: (i) a water soluble copolymer of a non-acidic ethylenically unsaturated polar monomer and a copolymerizable ethylenically unsaturated ester; (ii) a terpolymer or tetrapolymer of an ethylenically unsaturated polar monomer, an ethylenically unsaturated ester, and a monomer selected from 2-acrylamido-2-methylpropane sulfonic acid, N-vinylpyrrolidone, or both; or (iii) combinations thereof. The copolymer preferably contains from one to three polar monomers and from one to three unsaturated esters. The sealant compositions may also include at least one crosslinking agent, which is herein defined as a material that is capable of crosslinking such polymers to form a gel. The crosslinking agent may be, for example, an organic crosslinking agent such as a polyalkyleneimine, a polyfunctional aliphatic amine such as polyalkylenepolyamine, an aralkylamine, a heteroaralkylamine, or combinations thereof. Examples of suitable polyalkyleneimines are polymerized ethyleneimine and propyleneimine. Examples of suitable polyalkylenepolyamines are polyethylene- and polypropylene-polyamines. The amount of the crosslinkable material present in the sealant composition may be in a range of from about 1% to about 5% by weight of the sealant composition. The amount of the crosslinking agent may be in a range of from about 0.1% to about 5% by weight of the sealant compositions. A description of such polymers and crosslinking agents can be found in U.S. Pat. Nos. 5,836,392, 6,192,986, and 6,196,317, each of which is incorporated by reference herein in its entirety. In an embodiment, the crosslinkable material is a copolymer of acrylamide and t-butyl acrylate, and the crosslinking agent is polyethylene imine. These materials are commercially available in a single $H_2$ZERO service providing conformance control system sold by Halliburton Energy Services of Duncan, Okla.

The ethylenically unsaturated esters used in the crosslinkable material may be formed from a hydroxyl compound and an ethylenically unsaturated carboxylic acid selected from the group consisting of acrylic, methacrylic, crotonic, and cinnamic acids. The ethylenically unsaturated group is preferably in the alpha-beta or beta-gamma position relative to the carboxyl group, but it may be at a further distance. In an embodiment, the hydroxyl compound is an alcohol generally represented by the formula ROH, wherein R is an alkyl, alkenyl, cycloalkyl, aryl, arylalkyl, aromatic, or heterocyclic group that may be substituted with one or more of a hydroxyl, ether, or thioether group. The substituent can be on the same carbon atom of the R group as is bonded to the hydroxyl group in the hydroxyl compound. The hydroxyl compound may be a primary, secondary, iso, or tertiary compound. In an embodiment, a tertiary carbon atom is bonded to the hydroxyl group, e.g., t-butyl and trityl. In a desirable embodiment, the ethylenically unsaturated ester is t-butyl acrylate.

The non-acidic ethylenically unsaturated polar monomers used in the crosslinkable material can be amides, e.g., primary, secondary, and/or tertiary amides, of an unsaturated carboxylic acid. Such amides may be derived from ammonia, or a primary or secondary alkylamine, which may be optionally substituted by at least one hydroxyl group as in alkylol amides such as ethanolamides. Desirable examples of such carboxylic derived ethylenically unsaturated polar monomers are acrylamide, methacrylamide, and acrylic ethanol amide.

Additional examples of suitable crosslinkable materials include but are not limited to self-crosslinking, water-soluble, hydroxy unsaturated carbonyl monomers and water-soluble vinyl monomers. While not required, these monomers may optionally be used in combination with a suitable initiator such as an azo compound that is temperature activated over a range of temperatures. As used herein, an initiator is defined as a compound that is capable of forming free radicals that initiate polymerization of self-crosslinking monomers. Further, the vinyl monomers may also be used in combination with crosslinking agents such as multifunctional, vinyl monomers. The amount of the crosslinkable material present in the sealant composition may be in a range of from about 1% to about 5% by weight of the sealant composition. The amount of the crosslinking agent may be in a range of from about 0.05% to about 2% by weight of the sealant compositions.

Suitable hydroxy unsaturated carbonyls are generally represented by the formula:

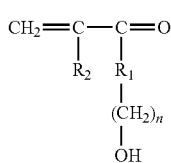

wherein $R_1$ is

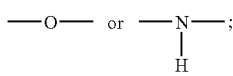

$R_2$ is hydrogen or —$CH_3$, and n is 1 or 2. The hydroxy unsaturated carbonyl may be a compound selected from the group comprising hydroxyethylacrylate, N-hydroxymethylacrylamide, N-hydroxymethyl methacrylamide, hydroxyethylmethacrylate, hydroxymethylacrylate, hydroxymethylmethacrylate, N-hydroxyethylacrylamide, N-hydroxyethylmethacrylamide, or combinations thereof.

Examples of suitable initiators are azo compounds generally represented by the formula:

$$Z-N=N-B$$

where Z is

B is Z or $R_2$;
$R_1$ is —$CH_3$ or C≡N;
A is

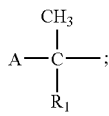

—$(CH_2)_2COOH$, or —$CH_3$;
$R_2$ is

$R_3$ is =N—, =NH, or =O; and
$R_4$ is

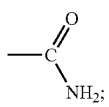

—$NH(CH_2)_2OH$, —$NHC(CH_2OH)_2CH_3$, or —$NHC(CH_2OH)_3$, where $R_4$ is

when $R_3$ is =N—, and
where $R_1$ is —C≡N and A is —$CH_3$ when B is $R_2$.

Desirable embodiments of azo compounds are 2,2'-Azobis(N,N'-dimethylene isobutyramidine)dihydrochloride, 2,2'-Azobis(2-amidinopropane)dihydrochloride, and 2,2'-Azobis[2-methyl-N-(2-hydroxyethyl)propionamide].

Further description of crosslinkable materials and initiators, can be found in U.S. Pat. Nos. 5,358,051 and 5,335,726, each of which is incorporated by reference herein in its entirety. In an embodiment, the crosslinkable material is 2-hydroxy ethyl acrylate monomer, and the initiators used therewith are different azo-compounds. These particular types of crosslinkable materials are commercially available in a single PERMSEAL system sold by Halliburton Energy Services. Additional disclosure regarding gel systems comprising one or more crosslinkable materials may be found in U.S. Pat. No. 6,936,574, which is incorporated by reference herein in its entirety.

In an embodiment, the sealant composition may include a gel system comprising partially polymerized furfuryl alcohol/aldehyde, a curing agent for causing the sealant composition to cure, a coupling agent for bonding the sealant compositions in a subterranean zone, and a diluent, also referred to as a partially polymerized furfuryl alcohol/aldehyde gel system. Such sealant compositions may also comprise a ductility imparting agent and a filler material for increasing the strength of the compositions. The amount of partially polymerized furfuryl alcohol/aldehyde in a sealant composition preferably ranges from about 30% to about 90% by weight of the sealant composition, more preferably from about 40% to about 80% by weight of the sealant composition, and most preferably from about 50% to about 70% by weight of the sealant composition. The partially polymerized furfuryl alcohol/aldehyde comprises polymerized furfuryl alcohol/aldehyde (i.e., furan-formaldehyde polymer) and non-polymerized (i.e., unreacted) furfuryl alcohol/aldehyde. The weight ratio of polymerized furfuryl alcohol/aldehyde to non-polymerized or unreacted furfuryl alcohol/aldehyde in the sealant compositions preferably ranges from about 1 to about 1, alternatively from about 10 to about 1. Using partially polymerized furfuryl alcohol/aldehyde as opposed to completely polymerized furfuryl alcohol/aldehyde in the sealant compositions ensures that the composition remains sufficiently viscous to be pumped into a well bore.

The partially polymerized furfuryl alcohol/aldehyde can be cured at temperatures above about 200° F., i.e., typical temperatures in a well bore. The cure time of the partially polymerized furfuryl alcohol/aldehyde at such temperatures is in the range of from about 6 to about 96 hours, allowing it to be placed into a wellbore without being concerned that it will harden before it reaches its intended location. In addition, the partially polymerized furfuryl alcohol/aldehyde forms a thermoset resin and thus cannot be re-softened despite being exposed to relatively high temperatures such as those experienced in a well bore. The polymerized furfuryl alcohol/aldehyde is substantially resistant to degradation by chemicals, making the sealant composition particularly suitable for isolating a subterranean zone from waste chemicals injected into a disposal well.

As mentioned above, the partially polymerized furfuryl alcohol/aldehyde gel systems comprise a curing agent, also known as a catalyst. A curing agent is herein defined as a material having the ability to cause the partially polymerized furfuryl alcohol/aldehyde to cure after a latent period to a hard, impermeable solid. As used herein, curing refers to polymerizing the non-polymerized furfuryl alcohol/aldehyde in the partially polymerized furfuryl alcohol/aldehyde, as well as further polymerization of previously polymerized furfuryl alcohol/aldehyde, thereby forming a crosslinked network of polymer chains. Curing agents suitable for curing the partially polymerized furfuryl alcohol/aldehyde at temperatures above about 200° F. include, but are not limited to, organic and inorganic acid anhydrides, ammonium salts, sodium bisulfate, hydrolyzable esters such as butyl acetate, furfuryl acetate, organic acids such as maleic acid, fumaric acid, inorganic acids such as phosphoric or sulfonic acid, and combinations thereof. Of these, organic acids are preferred and sodium bisulfate is more preferred. The amount of curing agent in a sealant composition preferably ranges from about 0.01% to about 10% by weight of the sealant composition, more preferably from about 1% to about 3% by weight of the sealant concentration.

The partially polymerized furfuryl alcohol/aldehyde gel systems also comprise a coupling agent, which is defined as a material having the ability to bond (i.e., adhere) the sealant compositions to solid surfaces, such as the surfaces of a metal pipe and of a subterranean well bore, when the sealant compositions are in a static state (e.g., when the sealant compositions are being cured). Examples of suitable coupling agents include, but are not limited to, silanes having functional groups that give the silanes the ability to bond with solid surfaces. Examples of such silanes are acrylate functionalized silanes, amine functionalized silanes, and vinyl functionalized silanes. Specific examples of silane coupling agents that can be utilized in the sealant compositions include, but are not limited to, N-2-(aminoethyl)-3-aminopropyltrimethoxysilane, 3-glycidoxypropyltrimethoxysilane, and N-beta-(aminoethyl)-gamma-aminopropyl trimethoxysilane. Of these, N-beta-(aminoethyl)-gamma-aminopropyl trimethoxysilane is preferred. The amount of silane coupling agent included in a sealant composition is preferably in the range of from about 0.1% to about 3% by weight of the sealant composition, more preferably about 1% by weight of the sealant composition.

A liquid diluent may also be present in the partially polymerized furfuryl alcohol/aldehyde gel systems to increase the flexibility thereof. Due to the presence of the diluent in the sealant compositions, the amount of partially polymerized furfuryl alcohol/aldehyde contained in the sealant compositions is relatively reduced. The less expensive diluent thus reduces the overall cost of the sealant compositions. The diluent preferably decreases the viscosity of the sealant compositions, ensuring that the compositions can be pumped into a well bore. Further, the diluent preferably reduces the brittleness of the sealant compositions, meaning that it reduces the tendency of the compositions to crack or flake when bent, flexed, or scratched. The diluent also preferably acts as a heat sink for the exothermic reaction that occurs as the non-polymerized furfuryl alcohol/aldehyde in the sealant compositions is cured. Examples of suitable diluents for use in the sealant compositions include, but are not limited to, alky acetates such as butyl acetate and furfuryl acetate, 2-butoxy ethanol, and combinations thereof. Of these, butyl acetate is preferred and furfuryl acetate is more preferred. The amount of diluent in a sealant composition preferably ranges from about 1% to about 60% by weight of the sealant composition, more preferably from about 15% to about 40% by weight of the sealant concentration.

The partially polymerized furfuryl alcohol/aldehyde gel systems can also comprise a ductility imparting agent. A ductility imparting agent is herein defined as a material having the ability to increase the ductility of the cured sealant composition, wherein ductility refers to the ability of a material to stretch under the application of tensile load and retain the deformed shape on the removal of the load. The presence of the ductility imparting agent in the sealant compositions preferably makes the compositions sufficiently flexible to stay bonded to a conduit, particularly a metal pipe, in a well bore despite the expansions and contractions thereof. Otherwise, a small gap could develop between the pipe and the sealant compositions, allowing fluids injected into the well to undesirably flow through the gap and back to the surface. Such expansion and contractions of the metal pipe can occur several times during the lifetime of a well due to pressure and temperature cycles in the well that may be caused by, for example, the disposal of waste chemicals having different densities and temperatures in the well. Examples of suitable ductility imparting agents include, but are not limited to, phthalate materials, i.e., organic liquids that cause the partially polymerized furfuryl/aldehyde alcohol to crosslink less tightly than normal. Examples of phthalate materials include alkyl phthalates such as diethyl phthalate, butyl benzyl phthalate, and di-(2-ethylhexyl)phthalate. Of these, diethyl phthalate is preferred. The amount of ductility imparting agent present in a sealant composition preferably ranges from about 0.01% to about 10% by weight of the sealant composition, preferably from about 1% to about 5% by weight of the sealant composition. Additional disclosure re partially polymerized furfuryl alcohol/aldehyde gel systems may be found in U.S. Pat. No. 6,951,250, which is incorporated by reference herein in its entirety.

In an embodiment, the sealant compositions may include a gel system comprising colloidally stabilized latex. A latex, also commonly known as a "polymer emulsion", includes a water emulsion of a rubber or plastic obtained by polymerization. As used herein, "colloidally stabilized latex" refers to a latex comprising polymer particles suspended in an aqueous solution and at least one protective colloid for providing stabilization to the colloidal polymer emulsion.

Protective colloids known in the art may be employed in the colloidally stabilized latex. Examples of suitable protective colloids include, but are not limited to, partially and fully hydrolyzed polyvinyl alcohols, cellulose ethers such as hydroxymethyl cellulose, hydroxyethyl cellulose, hydroxypropyl cellulose, starch and starch derivatives, and carboxymethyl cellulose, natural and synthetic gums such as gum tragacanth and gum arabic, polyacrylic acid, acrylates, poly(vinyl alcohol)co(vinyl amine) copolymers, and combinations thereof.

Examples of suitable colloidally stabilized latexes for use in the disclosed gel systems, and methods of making such latexes, are described in U.S. Pat. Nos. 5,900,451 and 6,130,287, both of which are incorporated by reference herein in their entirety. In those patents, the colloidally stabilized latexes are referred to as "stabilized emulsion polymers." In addition, examples of suitable commercially available colloidally stabilized latexes include BS 2100 latex, which is a carboxylated butadiene acrylonitrile latex available from Dow Reichhold Inc. As would be recognized by one skilled in the art, the dry form of such colloidally stabilized latexes may also be employed.

In an embodiment, the polymer contained in a colloidally stabilized latex may include an aliphatic conjugated diene monomer and at least one additional monomer comprising a non-aromatic unsaturated mono- or di-carboxylic ester monomer, an aromatic unsaturated monomer, at least one nitrogen-containing monomer, or combinations thereof. Examples of suitable aliphatic conjugated diene monomers include $C_4$ to $C_9$ dienes such as butadiene monomers, e.g., 1,3-butadiene, 2-methyl-1,3-butadiene and, 2 chloro-1,3 butadiene. Blends or copolymers of the diene monomers may also be used. Examples of suitable non-aromatic unsaturated monocarboxylic ester monomers include without limitation acrylates, methacrylates, and combinations thereof. The acrylates and methacrylates may include functional groups such as amino groups, hydroxy groups, and epoxy groups. Examples of suitable non-aromatic unsaturated dicarboxylic ester monomers include alkyl and dialkyl fumarates, itaconates, maleates, and combinations thereof, with the alkyl group having from one to eight carbons. In an embodiment, a non-aromatic unsaturated monocarboxylic ester monomer employed in the colloidally stabilized latex is methyl methacrylate. Examples of suitable aromatic unsaturated monomers include styrene and styrene derivatives such as alphamethylstyrene, p-methyl styrene, divinyl benzene, vinyltoluene, divinyl toluene, ethylstyrene, tert-butyl styrene, monochlorostyrene, dichlorostyrene, vinyl benzyl chloride, fluorostyrene, alkoxystyrenes (e.g., paramethoxystyrene), and combinations thereof. In a preferred embodiment, an aromatic unsaturated monomer included in the colloidally stabilized latex is styrene. Examples of suitable nitrogen-containing monomers include acrylonitrile, methacrylonitrile, acrylamide, methacrylamide, N-methylolacrylamide, alkylated N-methylolacrylamides such as N-methoxymethylacrylamide and N-butoxymethylacrylamide, and combinations thereof. In a preferred embodiment, a nitrogen-containing monomer included in the colloidally stabilized latex is acrylonitrile.

In certain embodiments, the colloidally stabilized latex also includes a surfactant having ethylenic unsaturation, an oxyalkylene functional monomer, or combinations thereof, incorporated in the backbone of the polymer. The surfactant is copolymerized with the aliphatic conjugated diene monomer and the additional monomer and is preferably located at the surface of the polymer particles. Since the surfactant is an integral part of the polymer, it most likely cannot desorb from the polymer. Examples of suitable surfactants are disclosed in U.S. Pat. No. 5,296,627, which is incorporated by reference herein in its entirety. The surfactant preferably has a hydrophobic portion that possesses terminal ethylenic unsaturation and a hydrophilic portion that contains a poly(alkyleneoxy) segment. Examples of suitable oxyalkylene functional monomers include monoesters of carboxylic acid or dicarboxylic acid, diesters of dicarboxylic acid, compounds generally represented by the following formulas, and combinations thereof:

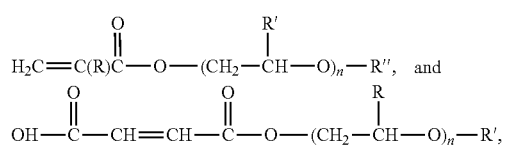

where R is hydrogen or a $C_1$-$C_4$ alkyl, R' is hydrogen or a $C_1$-$C_4$ alkyl, R" is hydrogen or a $C_1$-$C_4$ alkyl, and n is in a range of from 1 to 30. The oxyalkylene functional monomer is copolymerized with the aliphatic conjugated diene monomer and the additional monomer. Additional examples of surfactants and oxyalkylene functional monomers that may be employed in the colloidally stabilized latex are provided in aforementioned U.S. Pat. No. 5,900,451.

In the foregoing embodiment in which the colloidally stabilized latex includes a surfactant having ethylenic unsaturation and/or an oxyalkylene functional monomer, the amount of protective colloid present in the colloidally stabilized latex is preferably in the range of from about 0.1% to about 10% by total weight of the starting monomers, more preferably from about 1% to about 8%, and most preferably from about 2% to about 6%. The amount of aliphatic conjugated diene monomer present in the colloidally stabilized latex is preferably in the range of from about 5% to about 95% by total weight of the starting monomers, more preferably from about 20% to about 80%. The amount of non-aromatic unsaturated mono- or di-carboxylic ester monomer present in the colloidally stabilized latex is preferably in the range of from about 5% to about 95% by total weight of the starting monomers, more preferably from about 20% to about 80%. The amount of aromatic unsaturated monomer present in the colloidally stabilized latex is preferably in the range of from about 5% to about 95% by total weight of the starting monomers, more preferably from about 20% to about 80%. The amount of nitrogen-containing monomer present in the colloidally stabilized latex is preferably in the range of from about 5% to about 95% by total weight of the starting monomers, more preferably from about 20% to about 80%. The amount of surfactant present in the colloidally stabilized latex is preferably in the range of from about 0.1% to about 5% by total weight of the starting monomers, more preferably from about 1% to about 4%, and most preferably from about 2% to about 3%. The amount of oxyalkylene functional monomer present in the colloidally stabilized latex is preferably in the range of from about 0.1% to about 7% by total weight of the starting monomers, more preferably from about 1% to about 3%. When the surfactant and the oxyalkylene functional monomer are both used, the colloidally stabilized latex preferably contains from about 0.5% to about 2% of the surfactant and from about 1% to about 3% of the oxyalkylene functional monomer by total weight of the starting monomers.

In another embodiment, the colloidally stabilized latex includes a functionalized silane incorporated in the polymer that is capable of adsorbing the protective colloid. Examples of suitable functionalized silanes are generally represented by the following formula:

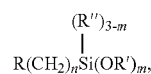

where R" is a $C_1$ to $C_5$ alkyl, R' is a $C_1$ to $C_5$ alkyl, R is SH, $CH_2\!=\!CH-$, $CH_2\!=\!C(CH_3)-C(O)O-$, $CH_2\!=\!CH-C(O)O-$, and

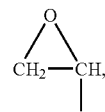

where n is in a range of from 1 to 10, and m is 2 or 3. A preferred functionalized silane is gamma mercaptopropyl trimethoxy silane in which R is SH, R' is $C_1$ alkyl, n is 3, and m is 3. Unsaturated mono- or di-carboxylic acid monomers and derivatives thereof, such as acrylic acid, methacrylic acid, itaconic acid, fumaric acid, and malieic acid, may also be employed in the colloidally stabilized latex. Additional examples of surfactants and oxyalkyllene functional monomers that may be employed in the colloidally stabilized latex are provided in aforementioned U.S. Pat. No. 6,130,287.

In the foregoing embodiment in which the colloidally stabilized latex includes a functionalized silane, the amount of protective colloid present in the latex is preferably in the range from about 1% to about 10% by total weight of the starting monomers. The amount of aliphatic conjugated diene monomer present in the colloidally stabilized latex is preferably in the range of from about 1% to about 99% by total weight of the starting monomers, more preferably from about 10% to about 70%, and most preferably from about 20% to about 50%. The amount of non-aromatic unsaturated mono- or di-carboxylic ester monomer present in the colloidally stabilized latex is preferably in the range from about 1% to about 99% by total weight of the starting monomers, more preferably from about 50% to about 80%. The functionalized silane may be present in the colloidally stabilized latex in various amounts. For example, the amount of silane present in the polymer may range from about 0.01% to about 2% by total weight of the starting monomers, preferably about 0.5%.

In yet another embodiment, when the colloidally stabilized latex composition contains cross-linkable monomers such as N-methylolacrylamide and alkylated N-methylolacrylamides such as N-methoxymethylacrylamide and N-butoxymethylacrylamide, appropriate acidic catalysts may be included in the latex to serve as crosslinking agents. Such acidic catalysts provide for the formation of a resilient rubbery mass. Examples of suitable acidic catalysts include paratoluene sulfonic acid, an ammonium salt such as ammonium sulfate, ammonium chloride, ammonium acetate, and combinations thereof. In an embodiment in which the colloidally stabilized latex contains both a vulcanizable monomer and a crosslinkable monomer, it may further include a vulcanizing agent in addition to the acidic catalyst. In another embodiment, the colloidally stabilized latex may include thermosetting resins such as melamine-formaldehyde derived resins and urea-formaldehyde resins that are capable of participating in the crosslinking reactions in the presence of the acidic catalysts.

The colloidally stabilized latex gel systems may also include salts of monovalent (e.g., $Na^+$), divalent (e.g., $Ca^{2+}$), and trivalent cations. In an embodiment, the compositions are saturated with such salts to ensure that they do not wash out or dissolve salt zones located in the subterranean formation. The colloidally stabilized latex has a relatively high tolerance to salts. Thus, it desirably remains stable in the presence of the salts contained in the sealant compositions and in the presence of salts that it may encounter in the wellbore without the need to introduce additional stabilizing surfactants, e.g., ethyoxylated nonylphenol surfactant, to the sealant compositions. It is understood that, if desired, such stabilizing surfactants still may be employed in the sealant compositions and may be distinguished from ethylenically unsaturated surfactants incorporated in the backbone of the latex polymer.

In an embodiment, the colloidally stabilized latex gel system may include the following components: vulcanizable groups such as the diene type of monomers discussed above, e.g., butadiene; vulcanizing agents such as sulfur, 2,2'-dithiobisbenzothiazole, organic peroxides, azo compounds, alkylthiuram disulfides, and selenium phenolic derivatives; vulcanization accelerators such as fatty acids such as stearic acid, metallic oxides such as zinc oxide, aldehyhyde amine compounds, guanidine compound, and disulfide thiuram compounds; vulcanization retarders such as salicylic acid, sodium acetate, phthalic anhydride, and N-cyclohexyl thiophthalimide; defoamers; fillers to increase or decrease the treatment density as required; or combinations thereof. Additional disclosure regarding suitable latexes containing such materials can be found in U.S. Pat. Nos. 5,293,938 and 5,159,980, each of which is incorporated by reference herein in its entirety. Additional disclosure re colloidally stabilized latex gel systems may be found in U.S. Published Application No. 2005/0230112A1, which is incorporated by reference herein in its entirety.

In an embodiment, the sealant composition may include a gel system comprising an alkali swellable latex and at least one pH increasing material. In embodiments, the pH increasing material is a compound capable of increasing the pH of the sealant composition to about 7 or higher. The pH increasing material can be a base-producing material, a cement, or combinations thereof.

"Alkali swellable latex" is defined as a latex emulsion that, when exposed to pH increasing materials, may swell and exhibit an increase in viscosity. Alkali swellable latexes typically contain, in addition to typical latex forming monomers, other monomers having acidic groups capable of reacting with pH increasing materials, thereby forming anionic pendant groups on the polymer back bone. Examples of typical latex forming monomers that may be used to make alkali swellable latexes include, without limitation, vinyl aromatic monomers (e.g., styrene based monomers), ethylene, butadiene, vinylnitrile (e.g., acrylonitrile), olefinically unsaturated esters of $C_1$-$C_8$ alcohol, or combinations thereof. In some embodiments, non-ionic monomers that exhibit steric effects and that contain long ethoxylate or hydrocarbon tails may also be present.

Monomers containing acid groups capable of reacting with pH increasing materials include ethylenically unsaturated monomers having at least one carboxylic acid functional group. Without limitation, examples of such carboxylic acid containing groups include acrylic acid, alkyl acrylic acids, such as methacrylic acid and ethacrylic acid, alpha-chloroacrylic acid, alpha-cyano acrylic acid, alpha-chloro-methacrylic acid, alpha-cyano methacrylic acid, crotonic acid, alpha-phenyl acrylic acid, beta-acryloxy propionic acid, sorbic acid, alpha-chloro sorbic acid, angelic acid, cinnamic acid, p-chloro cinnamic acid, beta-styryl acrylic acid, itaconic acid, maleic acid, citraconic acid, mesaconic acid, glutaconic acid, aconitic acid, fumaric acid, tricarboxy ethylene, or combinations thereof. In some embodiments, the carboxylic acid containing groups include itaconic acid, acrylic acid, or combinations thereof.

Preparation of alkali swellable latexes is discussed in U.S. Pat. Nos. 3,793,244; 4,861,822; and 5,563,201, which are incorporated herein by reference in their entirety. Without limitation, examples of suitable commercially available alkali swellable latexes include TYCHEM 68710, available from Dow Reichhold Specialty Latex LLC; ACRYSOL TT 615, available from Rohm and Haas; SN THICKENERs 920, 922, 924, 634 and 636, available from San Napco Limited, Sanyo Chemical Industry, Japan; ALCOGUM SL-120, available from Alco Chemical, a National Starch Company; HEUR-ASE P206, available from Dow Chemical Company; ADCOTE 37-220, available from Rohm and Haas Company; and JETSIZE AE-75, available from Eka Chemicals.

An alkali swellable latex may contain crosslinking agents that are suitable for facilitating the formation of a resilient rubbery mass, which may be used during the polymerization stage of the monomers or added to the latex prior to use (for example to the sealant composition). In embodiments wherein the alkali swellable latex contains vulcanizable groups, such as the diene type of monomers, crosslinking agents including vulcanizing agents such as sulfur, 2,2'-dithiobisbenzothiazole, organic peroxides, azo compounds, alkylthiuram disulfides, selenium phenolic derivatives and the like; vulcanization accelerators such as fatty acids (e.g., stearic acid), metallic oxides (e.g., zinc oxide), aldehyde amine compounds, guanidine compounds, disulfide thiuram compounds, and the like; vulcanization retarders such as salicylic acid, sodium acetate, phthalic anhydride and N-cyclohexyl thiophthalimide; defoamers; or combinations thereof, may be added just prior to use, for instance to a sealant composition. Such compositions are discussed in U.S. Pat. No. 5,293,938, which is incorporated by reference herein in its entirety. If the crosslinking agent is used during production of the latex, it may be a multifunctional monomer with more than one polymerizable group, for example—divinylbenzene, trimethylolpropane triacrylate, tetraethyleneglycol diacrylate, methylene bisacrylamide, and the like.

A base-producing material includes any compound capable of generating hydroxyl ions (OH⁻) in water to react with or neutralize an acid to form a salt. It is to be understood that the base-producing material can include chemicals that produce a base when reacted together. Without limitation, examples include reaction of an oxide with water. In one embodiment, the base-producing material has at least partial solubility in water, for example a solubility of 1% or greater in water. Examples of suitable base-producing materials include without limitation ammonium, alkali and alkali earth metal carbonates and bicarbonates, alkali and alkali earth metal hydroxides, alkali and alkali earth metal oxides, alkali and alkali earth metal phosphates and hydrogen phosphates, alkali and alkaline earth metal sulphides, alkali and alkaline earth metal salts of silicates and aluminates, water soluble or water dispersible organic amines, polymeric amines, amino alcohols, or combinations thereof. Without limitation, examples of suitable alkali and alkali earth metal carbonates and bicarbonates include $Na_2CO_3$, $K_2CO_3$, $CaCO_3$, $MgCO_3$, $NaHCO_3$, $KHCO_3$, ethanolamine and triethanolamine. It is to be understood that when carbonate and bicarbonate salts are used as base-producing material, a byproduct may be carbon dioxide, which may enhance the mechanical properties of the non-cement based sealant composition. Examples of suitable alkali and alkali earth metal hydroxides include, without limitation, NaOH, $NH_4OH$, KOH, LiOH, and $Mg(OH)_2$. Examples of suitable alkali and alkali earth metal oxides include, without limitation, BaO, SrO, $Li_2O$, CaO, $Na_2O$, $K_2O$, and MgO. Examples of suitable alkali and alkali earth metal phosphates and hydrogen phosphates include, without limitation, $Na_3PO_4$, $Ca_3(PO_4)_2$, $CaHPO_4$, and $KH_2PO_4$. Examples of suitable alkali and alkaline earth metal sulphides include, without limitation, $Na_2S$, CaS, SrS, and the like. Suitable silicate salts include, without limitation, sodium silicate, potassium silicate, and sodium metasilicate. Examples of suitable aluminate salts include, without limitation, sodium aluminate and calcium aluminate. FLOWCHECK and ECONOLITE are examples of commercial silicates available from Halliburton Energy Services, Inc. VERSASET alkali metal aluminate is a sodium aluminate that is commercially available from Halliburton Energy Services, Inc. Examples of organic amines include without limitation polymeric amines, monomeric amines containing one or more amine groups, and oligomeric amines. The organic amines may be completely or partially soluble in water. The organic amines may also be dissolved in an organic fluid such as those used as base oils in non-aqueous drilling fluids such as hydrocarbons and esters. Examples of suitable water soluble or water dispersible amines include triethylamine, aniline, dimethylaniline, ethylenediamine, diethylene triamine, cyclohexylamine, diethyltoluene diamine, 2,4,6-tri-dimethylaminomethylphenol, isophoroneamine, and the like. STRATALOCK D, STRATALOCK E, and STRATALOCK B are organic amines commercially available from Halliburton Energy Services, Inc.; JEFFAMINE is an organic amine commercially available from Huntsman Corp. of Austin, Texas; and EH-101, EH-102, EH-103 and EH-104 are organic amines commercially available from Applied Poleramic of Bernicia, Calif. Examples of suitable polymeric amines include chitosan, polylysine, poly(dimethylaminoethylmethacrylate), poly(ethyleneimine), poly(vinylamine-co-vinylalcohol), poly(vinylamine) and the like. CHITOCLEAR is an example of chitosan that is commercially available from Primex/Vanson Halosource of Redmond, Va. LUPAMIN is a formylated poly(vinylamine) commercially available from BASF AG Corporation. Examples of amino alcohols include ethanolamine, triethanolamine, tripropanolamine and the like.

In other embodiments, the base-producing material may comprise a resin such as thermosetting resins. Examples of suitable thermosetting resins include but are not limited to amino resins such as melamine-formaldehyde resins and urea-formaldehyde resins, phenolic resins such as phenol formaldehyde resins, furfural resins, or combinations thereof. With the amino resins, acid catalysts such as ammonium salts or organic acids such as p-toluene sulfonic acids may be used. Due to the acidic nature of the alkali swellable latex and the basic nature of amino resins, the amino resin can function as a base-producing material to swell the latex and in the process become polymerized to form a thermoset polymer, thus imparting additional strength to the sealant composition for example in loss-circulation treatments. To prevent undesired premature swelling and polymerization, the latex and amino resin are pumped separately and allowed to contact in the desired zone downhole. The resin compositions with traditional latexes and methods are discussed in U.S. Pat. No. 6,508,306, which is incorporated by reference herein in its entirety.

In alternative embodiments, the pH increasing material comprises a low pH cement composition (for example a high alumina cement) and a base-producing material. In such embodiments, an effective amount of cement composition and base-producing material can be contacted with the alkali swellable latex to increase the pH of the sealant composition.

Additional disclosure on gel systems comprising alkali swellable latex and at least one pH increasing material may be found in U.S. patent application Ser. No. 11/010,117 filed on Dec. 7, 2004 and entitled "Oilwell Sealant Compositions Comprising Alkali Swellable Latex," which is incorporated herein by reference in its entirety.

In an embodiment, the sealant composition may include a latex comprising at least one polar monomer and at least one elasticity-enhancing monomer. According to certain embodiments, the latex further comprises at least one stiffness-enhancing monomer. The latexes (polymer emulsions) used in these embodiments are water emulsions of a rubber or plastic obtained by a polymerization process.

According to the embodiments illustrated herein, the polar monomer may be selected from vinylamine, vinyl acetate, acrylonitrile, or acid, ester, amide, or salt forms of acrylates, such as acrylic acid; and the elasticity-enhancing monomer may be selected from ethylene, propylene, butadiene, 1,3-hexadiene or isoprene. In the embodiments that include a stiffness-enhancing monomer, the stiffness-enhancing monomer may be selected from styrene, t-butylstyrene, α-methylstyrene or sulfonated styrene.

Additional disclosure on gel systems including a latex comprising at least one polar monomer and at least one elasticity-enhancing monomer may be found in U.S. Published Application No. 2005/0167106A1, which is incorporated herein by reference in its entirety.

In an embodiment, the sealant composition may include a latex further comprising a styrene/butadiene copolymer suspended in water to form an aqueous emulsion. Examples of suitable latexes are described in U.S. Pat. No. 5,688,844, which is incorporated by reference herein in its entirety. LATEX 2000 emulsion is a styrene/butadiene copolymer latex commercially available from Halliburton Energy Services. The weight ratio of the styrene to butadiene in LATEX 2000 emulsion is about 25:75, and the amount of the copolymer in the LATEX 2000 emulsion is about 50% by weight of the aqueous emulsion. Suitable gel systems including this latex may also optionally comprise a stabilizer, such as 434C STABILIZER, a $C_{15}$ alcohol ethoxylated with 40 moles of ethylene oxide commercially available from Halliburton Energy Services.

In an embodiment, the sealant composition may comprise a flexible gel system, for example, latexes, liquid rubbers, silicone oils, or combinations thereof. In an embodiment, the flexible gel system has lower elastic modulus, higher tensile strength, lower compressive strength, and higher impact strength than a cement composition. Additionally, such flexible gel systems may contain a gas which may provide for contrasting compressibility of the flexible sealant. Examples of suitable flexible gel systems are described in U.S. Pat. Nos. 5,159,980; 5,293,938; 5,588,488; and 6,722,433, each of which is incorporated by reference herein in its entirety. Examples of suitable latex-based gel systems include the colloidally stabilized latex compositions described in copending U.S. Published Application Nos. US 2005/0230112 filed Apr. 19, 2004 and US 2005/0167106 filed Jan. 29, 2004, each of which is described above and incorporated by reference herein in its entirety.

In an embodiment, the sealant composition may include a gel system comprising a high density aqueous salt solution, a water soluble polymerizable monomer, and a polymerization initiator. The high density aqueous salt solution utilized can contain various salts. Such salts may include zinc bromide, calcium chloride, sodium chloride, potassium chloride and mixtures of such salts, with zinc bromide being a desirable selection. The salt solution utilized preferably has a density in the range of from about 9 to about 18 pounds per gallon.

A variety of water soluble polymerizable monomers can be utilized in the polymeric high density aqueous salt gel systems. Examples of such monomers include, but are not limited to, acrylic acid, methacrylic acid, acrylamide, methacrylamide, 2-methacrylamide-2-methyl propane sulfonic acid, 2-acrylamido-2-methyl propane sulfonic acid, N,N-dimethylacrylamide, vinyl sulfonic acid, N,N-dimethylaminoethylmethacrylate, 2-triethylammoniumethyl methacrylate chloride, N,N-dimethylaminopropylmethacrylamide, methacrylamidopropyl trimethylammonium chloride, N-vinyl pyrrolidone, vinyl phosphonic acid and methacryloyloxyethyl trimethylammonium sulfate and mixtures thereof. Additional more preferred monomers include hydroxyethylacrylate, hydroxymethylacrylate, hydroxyethylmethacrylate, N-hydroxymethylacrylamide, N-hydroxymethylmethacrylamide, polyethylene and polypropylene glycol acrylate and methacrylate, and mixtures thereof. Of these, hydroxyethylacrylate is most preferred.

Such water soluble polymerizable monomers are often used in combination with cross-linking multi-functional vinyl monomers such as glycerol dimethacrylate and diacrylate, ethoxylated and propoxylated glycerol dimethacrylate and diacrylate, ethoxylated and propoxylated glycerol trimethacrylate and triacrylate, ethoxylated and propoxylated trimethylolpropane trimethacrylate and triacrylate, ethoxylated and propoxylated pentaerythritol di, tri and tetra methacrylate and acrylate, methylene-bis-acrylamide and methacrylamide, polyethylene and polypropylene glycol dimethacrylate and diacrylate, allylmethacrylate and acrylate, and mixtures thereof.

Suitable polymerization initiators can be alkali metal persulfates, such as sodium persulfate, potassium persulfate and ammonium persulfate, peroxides such as hydrogen peroxide and tertiary-butyl hydro peroxide, oxidation-reduction systems employing oxidizers such as copper (I) and reducing agents such as bisulfate, and azo polymerization initiators. Examples of suitable azo polymerization initiators include: 2,2'-azobis(N,N'-dimethylene isobutyramidine)dihydrochloride, which has an activation temperature of 111° F.; 2,2'-azobis(2-amidinopropane)dihydrochloride, which has an activation temperature of 133° F.; and 2,2'-azobis[2-methyl-N-(2-hydroxyethyl)propionamide, which has an activation temperature of 187° F. These and other azo compounds can be utilized to initiate polymerization at temperatures in the range of from about 70° F. to about 190° F. without the use of an oxygen scavenger.

Additional disclosure on gel systems comprising a high density aqueous salt solution, a water soluble polymerizable monomer, and a polymerization initiator may be found in U.S. Pat. No. 6,187,839, which is incorporated herein by reference in its entirety.

In an embodiment, the sealant composition may include a gel system comprising water, a cross-linking agent, and a selected water soluble polymer or mixture of polymers. The water in such systems can be fresh water, unsaturated salt water or saturated salt water. The type of water utilized changes the pumping time of the sealing composition before gelation occurs. Generally, the pumping time increases with increasing salt concentration in the water. The water can contain one or more salts such as potassium chloride, ammonium chloride and sodium chloride, or it can be brine or seawater.

A variety of water-soluble polymers can be utilized in gel systems comprising water, a cross-linking agent, and a selected water-soluble polymer or mixture of polymers. The polymer or polymers can be selected from homopolymers, copolymers, terpolymers and mixtures thereof. Examples of such suitable polymers include, but are not limited to, polyacrylamide, polyvinyl pyrrolidone AMPS® (2-acrylamido-2-methylpropane sulfonic acid)/acrylamide copolymers, sulfonated styrene/maleic anhydride copolymers, vinylpyrrolidone/AMPS®/acrylamide terpolymers, AMPS®/N-N-dimethylacrylamide/acrylamide terpolymers, polyketones and oxidized polyvinyl alcohol. The water soluble polymers can be biodegradable and/or non-toxic. Examples of such polymers include alginic acid derivatives, oxidized polyvinyl alcohol, and low molecular weight acrylic polymers. Generally, by increasing the fraction of bulky or less reactive monomers in the polymer, the temperature at which gelation occurs can be increased, the pumping time at a given temperature can be increased and/or the stability of the gel formed can be increased or decreased.

While various cross-linking agents can be utilized in accordance with the gel systems comprising water, a cross-linking agent, and a selected water soluble polymer or mixture of polymers, non-toxic organic cross-linking agents which are free from metal ions and the like are desirable. Examples of such organic cross-linking agents are polyalkyleneimines, polyalkylenepolyamines, and mixtures thereof. In addition, water-soluble polyfunctional aliphatic amines, arylalkylamines, and heteroarylalkylamines can be utilized. Of these, polyalkyleneimines, and in particular polyethyleneimine, are desirable cross-linking agents for use in accordance with this gel system. Another desirable, organic cross-linking agent is chitosan, which is biodegradable and non-toxic. Chitosan is a polymeric glucosamine derivative of chitin, which is a naturally occurring glucosamine polysaccharide structurally similar to cellulose. When chitosan is utilized as the cross-linking agent, the water can include an organic or inorganic acid to facilitate the dissolution of the chitosan.

A gelation accelerating agent can be utilized to reduce pumping time before gelation at a given temperature. Such a gelation accelerating agent can be a pH control compound such as an alkali metal carbonate, bicarbonate or hydroxide, a mineral acid such as hydrochloric acid, an organic acid such as acetic acid, a Lewis acid such as boric acid, or other compounds such as ammonium chloride, urea and lactose.

Additional disclosure on gel systems comprising water, a cross-linking agent, and a selected water soluble polymer or mixture of polymers may be found in U.S. Pat. Nos. 6,176,315; 6,607,035; and 6,843,841, which are incorporated herein by reference in their entirety.

In an embodiment, the sealant composition may include a gel system comprising water, an oxidized chitosan-based compound, and a water-soluble compound having carbonyl groups. The water can be from any convenient source, including fresh water, seawater, natural brine, formulated brine, 2% KCl solution, and any mixtures in any proportion thereof.

The present disclosure advantageously provides an oxidized chitosan-based compound, a material derived from natural sources, to crosslink with a variety of polymers over a broad temperature range and produce gels for conformance applications. Chitosan-based compounds suitable for oxidation can be comprised of chitosan and chitosan salts of mineral or organic acids. Some commercial examples of chitosan include Chitosan Lactate, which is available from Vanson HaloSource, and HYDAGEN HCMF, which is available from Cognis.

The oxidized chitosan-based compound can be crosslinked with a variety of polymers that include, but are not limited to, a water-soluble compound having carbonyl groups, namely polyacrylamide, or alkyl acrylate polymers. Gels ranging from stiff and ringing type to "lipping" gels are obtained. In an embodiment, the water-soluble compound having carbonyl groups comprises an acrylamide-based polymer. Suitable acrylamide-based polymers include saturated or unsaturated acrylamide-based polymers. In certain embodiments, an acrylamide-based polymer includes partially hydrolyzed polyacrylamide (PHPA), a copolymer of acrylamide and t-butyl acrylate (PA-t-BA), acrylic acid/amps copolymer (AMPS/AA), and mixtures thereof. However, other acrylamide-based polymers that have the ability to crosslink with the oxidized chitosan-based compound can also be used.

In other embodiments of a gel system comprising water, an oxidized chitosan-based compound, and a water-soluble compound having carbonyl groups, the water-soluble compound having carbonyl groups includes oxidized starch. Starch suitable for oxidation as in the present invention can include a number of starch-based compounds. Examples of suitable starch-based compounds include cornstarch, potato starch, waxy maize, dextrinized starch, and any mixtures in any proportion thereof.

A wide variety of oxidizers can be used to oxidize starch. Examples of appropriate oxidizers include, but are not limited to, sodium hypochlorite, sodium periodate, hydrogen peroxide, peracetic acid, and any mixture in any proportion thereof. It is understood by those skilled in the art that related polysaccharides, other than oxidized starch, can be used to crosslink with the oxidized chitosan-based compound, including oxidized cellulose, oxidized agarose, oxidized partially-acetylated cellulose, oxidized gums, and combinations thereof. Other compounds that can be used include dialdehyde starch (DAS), dialdehyde cellulose, and combinations thereof.

Additional disclosure on gel systems comprising water, an oxidized chitosan-based compound, and a water-soluble compound having carbonyl groups may be found in U.S. Pat. No. 6,764,981, which is incorporated herein by reference in its entirety.

In an embodiment, the sealant composition includes a gel system comprising water, an amine-based polymer, a polysaccharide-based polymer, and an oxidizing agent that is capable of at least partially oxidizing at least the polysaccharide-based polymer. The water for use in the well treatment fluid can be from any convenient source, including fresh water, seawater, natural brine, formulated brine, 2% KCl solution, and any combination in any proportion thereof. Representative soluble salts are the chloride, bromide, acetate and formate salts of potassium, sodium, calcium, magnesium and zinc.

The amine-based polymer in the gel system also comprising water, a polysaccharide-based polymer, and an oxidizing agent comprises at least one member selected from the group of chitosan, chitosan salts, oxidized chitosan, poly(vinyl alcohol-vinyl amine), polylysine, polyethyleneimine, and any combination in any proportion thereof. In a desirable embodiment, the amine-based polymer comprises a chitosan-based polymer. The chitosan-based polymer can comprise chitosan, chitosan salts, oxidized chitosan, and any combination in any proportion thereof. The chitosan-based polymers preferably have pendant amino groups on the polymer which can react with the carbonyl group of the oxidized polysaccharides. The pendant amino group may be a primary or secondary amine. Occasionally, a pendant amine may be a part of a branched structure of a polymer. Examples of such polymers which are useful in the present invention include polyethyleneimine. Poly(vinyl alcohol vinyl amine) polymers, also referred to as vinylalcohol/vinylamine copolymers are available, for example, from ERKOL Corp. of Tarragona Spain.

In an advantageous embodiment, an oxidized chitosan-based polymer is employed to overcome the relative poor solubility of chitosan. The oxidized chitosan-based polymer can be prepared by oxidizing the chitosan-based polymer selected from the group consisting of chitosan, chitosan salts, and any combination in any proportion thereof. The oxidized chitosan-based polymer can serve both as a crosslinker and base polymer to the oxidized polysaccharide-based polymer. Some examples of chitosan-based polymers suitable for oxidation in the present invention include chitosan, chitosan salts with mineral and organic acids, and any combination in any proportion thereof. Commercial examples of chitosan are already been introduced above, and include Chitosan Lactate available from Vanson HaloSource and HYDAGEN HCMF available from Cognis.

To oxidize the chitosan-based polymer, a wide variety of oxidizers can be used. Examples of oxidizers include sodium hypochlorite, sodium periodate, hydrogen peroxide, peracetic acid, and any mixtures in any proportion thereof. Other oxidizers include alkali, alkaline earth and transition metal salts of periodate, hypochlorite, perbromate, chlorite, chlorate, hydrogen peroxide, soluble peroxide salts, persulfate salts, percarboxylic acids, oxyhalo acids, and any combination in any proportion thereof. The selection of the oxidizer and the concentration of oxidizer should be sufficient to oxidize or degrade the chitosan-based polymer to a desired solubility. Oxidizing the chitosan-based polymer increases its solubility. By increasing solubility of the chitosan-based polymer, it can be used in higher concentration in fluids, thereby utilizing it as the base polymer in the fluids, rather than merely as a crosslinker.

It should be understood by those skilled in the art that the oxidizing agent is also capable of oxidizing the chitosan-based polymer to at least partially self-crosslink in water. Further, the oxidizing agent is capable of oxidizing the polysaccharide-based polymer to at least partially self-crosslink in water. Still further, the oxidizing agent is also capable of oxidizing the polysaccharide-based polymer to form an oxidized polysaccharide-based polymer and crosslink with the chitosan-based polymer in water. The oxidizing agent is also capable of oxidizing the chitosan-based polymer to form an oxidized chitosan-based polymer and is capable of oxidizing the polysaccharide-based polymer to form an oxidized polysaccharide-based polymer, such that the oxidized chitosan-based polymer crosslinks with the oxidized polysaccharide-based polymer in water. Gels ranging from stiff and ringing type to "lipping" gels can be obtained.

Examples of polysaccharide-based polymers for use in the well treatment fluid of the present invention include starch, cellulose, agarose, partially-acetylated cellulose, hydroxyl ethyl cellulose, gum, and any combination in any proportion thereof. The gum may be selected from the group consisting of guar, locust bean gum, gum arabic, tragacanth, gutta percha, xanthan salts, alginate salts, carrageenan, scleroglucan, and any combination in any proportion thereof.

In embodiments, starch is selected from the group consisting of corn starch, potato starch, waxy maize, dextrinized starch and any mixtures in any proportion thereof. Additionally, the starches may be modified chemically prior to oxidation. Examples of such starches include cationic starches, hydroxyethylated starches, hydroxypropylated starches, carboxylated starches and the like.

A variety of oxidizers can be used to oxidize the starch, including oxidizers selected from the group consisting of alkali, alkaline earth and transition metal salts of, for example, periodate, hypochlorite, perbromate, chlorite, chlorate, hydrogen peroxide, peracetic acid, soluble peroxide salts, persulfate salts, percarboxylic acids, oxyhalo acids, and combination in any proportion thereof.

Additional disclosure on gel systems comprising water, an amine-based polymer, a polysaccharide-based polymer, and an oxidizing agent that is capable of at least partially oxidizing at least the polysaccharide-based polymer may be found in U.S. Published Application No. 2004/0182576A1, which is incorporated herein by reference in its entirety.

In an embodiment, the sealant composition includes a gel system comprising an aqueous fluid, chitosan, a polymer capable of reacting with chitosan, and a gelation retarding additive wherein the gelation retarding additive comprises a carboxylic acid anhydride.

The aqueous fluid used for the crosslinkable polymer compositions of the present invention may include, but is not limited to, freshwater, seawater, saltwater, or brines (e.g., natural brines, formulated brines, etc.), or a mixture thereof. The aqueous fluid may be from any source, provided that it does not adversely affect the crosslinkable polymer compositions of the present invention. Formulated brines may be produced by dissolving one or more soluble salts in water, a natural brine, or seawater. Representative soluble salts include the chloride, bromide, acetate, and formate salts of potassium, sodium, calcium, magnesium, and zinc. To facilitate the dissolution of the chitosan, the aqueous fluid may further contain an organic or inorganic acid.

The gel system comprises chitosan, including chitosan, chitosan salts of mineral or organic acids, unoxidized chitosan, oxidized chitosan, or modified chitosan, or mixtures thereof. Suitable details on chitosan, oxidized chitosan, oxidation of chitosan, chitosan oxidizers, and employment of chitosan in gel systems are described above.

Any suitable polymers that are capable of reacting with chitosan may be used in the gel systems. Generally, suitable polymers include, among others, those polymers comprising a carbonyl group, such as, for example, saturated or unsaturated acrylamide-based polymers. Other examples include, but are not limited to, polyacrylamide, acrylamide copolymers, polyvinyl pyrrolidone, 2-acrylamido-2-methylpropane sulfonic acid/acrylamide copolymers, sulfonated styrene/maleic anhydride copolymers, vinylpyrrolidone/2-acrylamido-2-methylpropane sulfonic acid/acrylamide terpolymers, 2-acrylamido-2-methylpropane sulfonic acid/N-N-dimethylacrylamide/acrylamide terpolymers, polyketones, acrylamide/t-butyl acrylate copolymers, oxidized polyvinyl alcohol, and water-soluble or water-dispersible polyesters (such as poly(lactic acid)), and mixtures and derivatives thereof. Those of ordinary skill in the art will recognize with the benefit of this disclosure that other polymers that react with chitosan may also be used in the present invention.

In some embodiments, the polymer comprising a carbonyl group includes oxidized starch. Examples of suitable starches include, but are not limited to, corn starch, potato starch, waxy maize, dextrinized starch, and mixtures thereof. A wide variety of oxidizers can be used to oxidize starch. Examples of suitable oxidizers include, but are not limited to, sodium hypochlorite, sodium periodate, hydrogen peroxide, peracetic acid, and mixtures thereof. Those skilled in the art with the benefit of this disclosure will appreciate that related oxidized polysaccharides, other than oxidized starch, can be used to crosslink with chitosan, including oxidized cellulose, oxidized agarose, oxidized partially-acetylated cellulose, oxidized gums, and mixtures thereof. Other compounds that may be used include dialdehyde starch (DAS), dialdehyde cellulose, and mixtures thereof. In certain embodiments, the oxidized polysaccharides contain at least some ketone, aldehyde, or anhydride functional groups upon oxidation.

The gel systems further comprise a gelation retarding additive. Among other things, the gelation retardation additive may act to retard the reaction between the chitosan and the polymer, e.g., the gelation of the crosslinkable polymer compositions. Delaying the gelation of the crosslinkable polymer compositions may be desirable to increase the pumping time before gelation at a given temperature. In addition, the carboxylic acid anhydrides of the present invention may have some water solubility or some water dispersibility. Suitable gelation retarding additives include carboxylic acid anhydrides. Examples of suitable carboxylic acid anhydrides include, but are not limited to, acetic anhydride, propionic anhydride, succinic anhydride, maleic anhydride, and mixtures and derivatives thereof.

Additional disclosure on gel systems comprising an aqueous fluid, chitosan, a polymer capable of reacting with chitosan, and a gelation retarding additive may be found in U.S. patent application Ser. Nos. 11/170,237 and 11/170,280, both filed Jun. 28, 2005 and entitled "Crosslinkable Polymer Compositions and Associated Methods," each of which is incorporated herein by reference in its entirety.

In an embodiment, the sealant composition includes a gel system comprising a pumpable, corrosion resistant, hardenable epoxy sealing composition which can be displaced by, or otherwise contacted with, water, or a water-containing fluid, without the occurrence of premature hardening or other adverse result. In embodiments, such an epoxy sealing composition is comprised of a water compatible, hardenable epoxide containing liquid, or a mixture of such liquids, and a hardening agent for the epoxide containing liquid. The hardenable epoxy sealing compositions are compatible with water so that they can be displaced by or otherwise contacted with water without the occurrence of premature hardening or other adverse result. The epoxy sealing compositions can also include one or more organosilane compounds, which tend to enhance their resiliencies and bond strengths after hardening.

While various water compatible epoxide-containing liquids can be used, desirable such liquids are the diglycidyl ether of 1,4-butanediol, the diglycidyl ether of neopentylglycol, the diglycidyl ether of cyclohexane dimethanol, and mixtures of two or more of such liquids. A suitable water compatible epoxide-containing liquid comprised of the diglycidyl ether of 1,4-butanediol is commercially available from Resolution Performance Products under the trade name HELOXY Modifier 67. A suitable water compatible diglycidyl ether of neopentylglycol is commercially available from Resolution Performance Products under the tradename HELOXY Modifier 68. A suitable water compatible diglycidyl ether of cyclohexane dimethanol is commercially available from Resolution Performance Products under the tradename HELOXY Modifier 107.

A variety of hardening agents can be utilized in the hardenable epoxy sealing composition. Such agents may include, but not limited to, aliphatic amines, aromatic amines, amide amines, amido amines, imadazoles, carboxylic acid anhydrides, and mixtures of two or more of such hardening agents. Examples of aliphatic and aromatic amine hardening agents include, but are not limited to, triethylenetetraamine, ethylenediamine, N-cocoalkyltrimethylenediamine, isophoronediamine, diethyltoluenediamine, and tris(dimethylaminomethylphenol). Examples of suitable carboxylic acid anhydrides are methyltetrahydrophthalic anhydride, hexahydrophthalic anhydride, maleic anhydride, polyazelaic polyanhydride, and phthalic anhydride.

One or more organosilane compounds may be included in the hardenable epoxy sealing compositions. Suitable organosilane compounds include, but are not limited to, 3-aminopropyltrimethoxysilane, 3-aminopropyltriethoxysilane, N-2-(aminoethyl)-3-aminopropyltriethoxysilane and 3-glycidoxypropyltrimethoxysilane.

In addition to the gel system comprising the pumpable, corrosion resistant, hardenable epoxy described, certain hydraulic cements may be desirable as components of this sealant composition. The hydraulic cement comprises sufficient water to form a pumpable slurry. A variety of hydraulic cements can be used, such as those comprising calcium, aluminum, silicon, oxygen, and/or sulfur, which set and harden by reaction with water. Such hydraulic cements include, but are not limited to, Portland cements, pozzolana cements, gypsum cements, high alumina content cements, silica cements, slag cements and high alkalinity cements. The water utilized in the cement composition can be fresh water, salt water, i.e., water containing one or more salts dissolved therein, brine or seawater.

Additional disclosure on gel systems comprising a pumpable, corrosion resistant, hardenable epoxy sealing composition which can be displaced by, or otherwise contacted with, water, or a water-containing fluid, without the occurrence of premature hardening or other adverse result may be found in U.S. Pat. No. 6,321,841, which is incorporated herein by reference in its entirety.

In an embodiment, the sealant composition includes a gel system comprising a water-soluble polymer having acylated amine units that acts as a cross-linker. This gel system further comprises a crosslinkable water-soluble polymer that comprises a functional group selected from the group consisting of carboxylic acid and carboxylic acid derivative.

The water for use in the gel system can be from any convenient source, including fresh water, seawater, natural brine, formulated brine, 2% KCl solution, and any mixture of any of the foregoing in any proportion thereof. Formulated brine is manufactured by dissolving one or more soluble salts in water, natural brine, or seawater. Representative soluble salts are the chloride, bromide, acetate and formate salts of potassium, sodium, calcium, magnesium and zinc.

The gel system includes a crosslinkable, water-soluble polymer comprising at least one acylated amine unit. The amine is acylated preferably prior to injection into the subterranean formation. In this way, the composition of the invention advantageously has a low tendency to crosslink and gel in the wellbore (i.e. reduced gel build-up) and has rapid crosslinking at the high temperatures of the formation. Preferred acylated amine groups include acetyl and formyl amine groups. One way that the acylated amine is formed is by reacting a polyamine with a carboxylic acid anhydride or ester. Preferred carboxylic anhydrides for acylation are acetic anhydride and formic anhydride. Preferred carboxylic esters for acylation include alkyl acetate, for example ethyl acetate, butyl acetate, ethyl formate, and butyl formate. The acylated amine can also be formed by acylating poly(vinyl amine/vinyl alcohol). Alternately, the acylated amine can be formed by acylating polyalkylene polyamine, for example, polyethyleneimine (PEI). Also, the acylated amine can be formed by polymerizing a monomer containing acylated amine, for example vinylformamide to form a water-soluble polymer polyvinylformamide. The vinylformamide can be copolymerized with other monomers, for example 2-acrylamido-2-methylpropanesulfonic acid (AMPS), and/or N,N-dimethylacrylamide (NNDMA). Polyvinylformamide for use in the invention provides a more environmentally acceptable crosslinker as compared to the conventionally-used crosslinker, PEI. As those skilled in the art understand, other acylated amines that are not mentioned herein are also useful for the invention.

Preferably, the degree of acylation of the amine groups in the water-soluble polymer can range from 5% to 100% of the amine groups. In the case of acylating polyamine, the degree of acylation can be varied by controlling the amount of acylating compound, for example carboxylic anhydride in relation to the molar amounts of the amines present in the polymer. Alternately, the degree of acylation in an acylated polymer can be varied by controlled hydrolysis of the acyl groups in the presence of an acid or a base.

The concentration of the acylated amine in the treatment fluid is selected to give a desired gel time. For example, the concentration can be in the range of 0.2% to 10% by weight of the total fluid. The ratio of the acylated amine to the crosslinkable water-soluble polymer comprising a functional group consisting of carboxylic acid and carboxylic acid derivative is from about 1:0.5 to about 1:20, preferably in the ratio of 1:3 to 1:10.

The composition for treating a subterranean formation also comprises a crosslinkable water-soluble polymer comprising a functional group selected from the group consisting of carboxylic acid and carboxylic acid derivative. The carboxylic acid derivative, for example, can consist of an ester, an amide, an anhydride, an imide, and a nitrile group. Such polymers can be homopolymers, copolymers, and/or terpolymers made from a variety of monomers. Examples of suitable polymers include the polymerization reaction product of acrylamide and t-butyl acrylate, a terpolymer of 2-acrylamido-2-methylpropanesulfonic acid copolymer (AMPS), acrylamide (AA), and N,N-dimethylacrylamide (NNDMA). Such polymers can be obtained by processes described in U.S. Pat. No. 6,192,986 that was issued on Feb. 27, 2001; U.S. Pat. No. 5,836,392 that was issued on Nov. 17, 1998; and U.S. Pat. No. 6,176,315 that was issued on Jan. 23, 2001, all assigned to the assignee of the present invention, and all herein incorporated by reference in their entirety. Examples of such polymers include polyacrylamide; acrylamide/t-butyl acrylate copolymer; alkyl acrylate polymer; 2-acrylamido-2-methylpropane sulfonic acid/acrylamide copolymers; sulfonated styrene/maleic anhydride copolymers; vinylpyrrolidone/2-acrylamido-2-methylpropane sulfonic acid/acrylamide terpolymers; 2-acrylamido-2-methylpropane sulfonic acid/N-N-dimethylacrylamide/acrylamide terpolymers; sulfonated styrene/maleic anhydride copolymer; a vinyl pyrrolidone/2-acrylamido-2-methylpropane sulfonic acid/acrylamide terpolymer; an 2-acrylamido-2-methylpropane sulfonic acid/N-N-dimethylacrylamide/acrylamide terpolymer; and any mixture of any of the foregoing in any proportion thereof. Other compounds that can be used to crosslink with the water-soluble polymer comprising acylated amine units are disclosed in U.S. Pat. No. 6,176,315, issued on Jan. 23, 2001 by the assignee of the present invention, which is incorporated by reference in its entirety. Another example of an acrylamide based copolymer is described in U.S. Pat. No. 5,836,392.

Additional disclosure on gel systems comprising a water-soluble polymer comprising acylated amine units that acts as a cross-linker may be found in U.S. patent application Ser. No. 11/133,505 filed May 20, 2005 and entitled "Compositions and Methods for Plugging and Sealing a Subterranean Formation," which is incorporated herein by reference in its entirety.

In an embodiment, the sealant composition includes a gel system comprising water; a water-soluble polymer comprising polymerized vinyl amine units; and an organic compound capable of crosslinking with the vinyl amine units of the water-soluble polymer. As described above, the water used for the well treatment fluid can be from any convenient source.

The water-soluble polymer of the gel systems comprises polymerized vinyl amine units, for example vinyl amine units or a copolymer of vinyl amine units and vinyl alcohol units, also known as polyvinyl amine/vinyl alcohol. Such copolymer can be in the form of a salt.

In some embodiments, the gel systems also comprise an organic compound capable of crosslinking with the vinyl amine units of the water-soluble polymer. The organic compound may be selected from the group consisting of polyacrylamide; acrylamide/t-butyl acrylate copolymer; alkyl acrylate polymer; 2-acrylamido-2-methylpropane sulfonic acid/acrylamide copolymers; sulfonated styrene/maleic anhydride copolymers; vinylpyrrolidone/2-acrylamido-2-methylpropane sulfonic acid/acrylamide terpolymers; 2-acrylamido-2-methylpropane sulfonic acid/N-N-dimethylacrylamide/acrylamide terpolymers; sulfonated styrene/maleic anhydride copolymer; a vinyl pyrrolidone/2-acrylamido-2-methylpropane sulfonic acid/acrylamide terpolymer; a 2-acrylamido-2-methylpropane sulfonic acid/N-N-dimethylacrylamide/acrylamide terpolymer; and an combination in an proportion of the foregoing. The organic compound may also comprise an acrylamide-based polymer.

Additional disclosure on gel systems comprising water; a water-soluble polymer comprising polymerized vinyl amine units; and an organic compound capable of crosslinking with the vinyl amine units of the water-soluble polymer may be found in U.S. Published Application No. 2005/0230113A1, which is incorporated herein by reference in its entirety.

In an embodiment, the sealant composition includes a gel system comprising a water-soluble salt and an activator. Examples of suitable water-soluble salts include without limitation an alkali metal metasilicate compound, an alkali metal silicate compound, an alkali metal aluminate, or combinations thereof. In an embodiment, the water-soluble salt comprises sodium silicate, potassium silicate, sodium aluminate, or combinations thereof, preferably sodium silicate. Examples of activators include, ethyl acetate, urea, sugar, sodium acid pyrophosphate, chloride, acetate and nitrate salts of alkali and alkaline earth metals, or combinations thereof. Reaction of the activator and the water-soluble salt, for example sodium silicate, forms an insoluble silica gel or metal silicate matrix. Additional disclosure on gel systems comprising a water-soluble salt and an activator may be found in U.S. patent application Ser. No. 10/970,444 filed Oct. 20, 2004 and entitled "Methods of Using a Swelling Agent in a Wellbore," which is incorporated herein by reference in its entirety.

In an embodiment, the sealant composition includes a gel system comprising a synthetic hectorite clay gelling and thixotropy-imparting agents. The gelling and thixotropy-imparting agents may provide stable viscosity to a well treatment fluid when at rest as well as thixotropic properties whereby the viscosity of the treating fluid is reduced during pumping but returns when the treating fluid is static. The gelling and thixotropy-imparting agents are in the form of free-flowing powders, which are easily dispersed in water. Also, the agents are fine grained with an average particle size of less than one micron.

The synthetic hectorite clay gelling and thixotropy-imparting agents may be selected from the group comprising a synthetic hectorite clay having the composition by weight on a dry basis of 59.5% $SiO_2$, 27.5% MgO, 0.8% $Li_2O$ and 2.8% $Na_2O$, a synthetic hectorite clay having the composition by weight on a dry basis of 54.5% $SiO_2$, 26.0% MgO, 0.8% $Li_2O$, 5.6% $Na_2O$ and 4.1% $P_2O_5$ and a synthetic hectorite clay having the composition by weight on a dry basis of 54.5% $SiO_2$, 26.0% MgO, 0.8% $Li_2O$, 5.6% $Na_2O$, 4.1% $P_2O_5$ and also containing inorganic polyphosphate peptizers. The hectorite clay gelling and thixotropy-imparting agent may be present in the well treatment fluid in an amount in the range of from about 0.5% to about 5% by weight thereof.

The well treatment fluid employed in the practice of this invention may be substantially any aqueous fluid including fresh water that contains a relatively small amount of inorganic monovalent salts, multivalent salts or both. That is, the water should contain at least a small amount of one or more salts, but not more than an amount of about 5% by weight of the aqueous liquid. The presence of the small amount of salt or salts in the water enables the synthetic hectorite clay gelling and thixotropy-imparting agent to form a gel in the aqueous liquid and impart thixotropic properties thereto.

In order to stabilize the viscosity during pumping a separate viscosity stabilizing gelling agent can be included in the well treatment fluid. Examples of commonly used gelling agents include galactomannans, modified or derivatized galactomannans and cellulose derivatives. Cross-linking agents, breakers and other additives can also be included in the viscous well treating fluids useful in accordance with this invention.

Additional disclosure on gel systems comprising a hectorite clay gelling and thixotropy-imparting agent may be found in U.S. Published Application No. 2003/0213593A1, which is incorporated herein by reference in its entirety.

In an embodiment, the sealant composition includes a gel system comprising an acrylamide polymer and a crosslinking agent. The acrylamide polymer may be either polyacrylamide or partially hydrolyzed polyacrylamide, depending on the number of carboxylate groups it has. An acrylamide polymer having substantially less than 1% of the acrylamide groups in the form of carboxylate groups is termed polyacrylamide (PA); an acrylamide polymer having at least 1% but not 100% of the acrylamide groups in the form of carboxylate groups is termed partially hydrolyzed polyacrylamide (PHPA). The average molecular weight of the acrylamide polymer may be in the range of about 10,000 to about 50,000,000 and preferably about 100,000 to about 20,000,000, and most preferably about 200,000 to about 12,000,000.

The crosslinking agent may be a complex or mixture of complexes. The term "complex" is defined herein as an ion or molecule containing two or more interassociated ionic, radical or molecular species. A complex ion as a whole has a distinct electrical charge while a complex molecule is electrically neutral.

The complex may include at least one or more electropositive chromium III species and one or more electronegative carboxylate species. The complex may advantageously also contain one or more electronegative hydroxide and/or oxygen species. It is believed that, when two or more chromium III species are present in the complex, the oxygen or hydroxide species may help to bridge the chromium III species. Each complex optionally contains additional species which are not essential to the polymer crosslinking function of the complex. For example, inorganic mono- and/or divalent ions, which function merely to balance the electrical charge of the complex, or one or more water molecules may be associated with each complex. Representative formulae of such complexes include:

$[Cr_3(CH_3CO_2)6(OH)_2]^{+1}$;
$[Cr_3(OH)_2(CH_3CO_2)_6]NO.6H_2O$;
$[Cr_3(H_2O)_2(CH_3CO_2)_6]^{+3}$; or
$[Cr_3(H_2O)_2(CH_3CO_2)_6](CH_3CO_2)_3.H_2O$.

Trivalent chromium and chromic ion are equivalent terms encompassed by the term chromium III species as used herein. The carboxylate species are advantageously derived from water-soluble salts of carboxylic acids, especially low molecular weight mono-basic acids. Carboxylate species derived from salts of formic, acetic, propionic, and lactic acid, lower substituted derivatives thereof and mixtures thereof are especially preferred. The carboxylate species may include the following water-soluble species: formate, acetate, propionate, lactate, lower substituted derivatives thereof, and mixtures thereof. The optional inorganic ions may include sodium, sulfate, nitrate and chloride ions.

Additional disclosure on gel systems comprising an acrylamide polymer and a crosslinking agent may be found in U.S. Pat. Nos. 4,629,747 and 4,683,949, each of which is incorporated herein by reference in its entirety.

In some embodiments, the LPM is a particulate material such as cement. In embodiments where the LPM comprises a cement, any suitable cement known in the art may be used in the sealant compositions. An example of a suitable cement includes hydraulic cement, which comprises calcium, aluminum, silicon, oxygen, and/or sulfur and which sets and hardens by reaction with water. Examples of hydraulic cements include, but are not limited to a Portland cement, a pozzolan cement, a gypsum cement, a high alumina content cement, a silica cement, a high alkalinity cement, or combinations thereof. Preferred hydraulic cements are Portland cements of the type described in American Petroleum Institute (API) Specification 10, 5$^{th}$ Edition, Jul. 1, 1990, which is incorporated by reference herein in its entirety. The cement may be, for example, a class A, B, C, G, or H Portland cement. Another example of a suitable cement is microfine cement, for example, MICRODUR RU microfine cement available from Dyckerhoff GmBH of Lengerich, Germany.

Other particulate material may be used in the sealant composition alone or in combination with cement. The particulate material may be an inert material, and may be sized (e.g., a suitable particle size distribution) based upon the characteristics of the void space to be sealed. Examples of suitable particulate material include, but are not limited to, cement, sand, silica flour, gilsonite, graphite; fibrous materials such as cedar bark, shredded cane stalks and mineral fiber; flaky materials such as mica flakes and pieces of plastic or cellophane sheeting, ground battery casings, ground rubber tires; and granular materials such as ground and sized limestone or marble, wood, nut hulls, formica, corncobs, gravel, ground battery casings, ground rubber tires and cotton hulls.

In an embodiment, the LPM is a water-soluble material. Examples of water-soluble materials suitable for use as an LPM include without limitation starches, hydrophobically modified polymers, or combinations thereof. In an embodiment, the LPM is a granular starch or mixture of starches. Accordingly, as used hereinafter, the term "starch" is understood to include one or more natural starches, one or more chemically modified starches, and mixtures of one or more natural and/or chemically modified starches. Suitable natural starches include, but are not limited to, those of potato, wheat, tapioca, rice, and corn. Alternatively, the LPM is a pre-gelatinized starch. Pre-gelatinized starches may be obtained commercially or they may be prepared by pre-gelatinization treatment. For pre-gelatinization, the chosen starch granules are heated in water to a point where the starch granules swell irreversibly. Upon cooling, this swollen structure is retained. The use of pre-gelatinized starches may be advantageous, since these materials are stable at higher temperatures in the formation, e.g., up to 300° F. Chemically modified starches are those derived from natural starches by chemical reaction of a natural starch with a suitable organic reactant. Examples of suitable chemically modified starches include, but are not limited to, carboxymethyl starch, hydroxyethyl starch, hydroxypropyl starch, acetate starch, sulfaniate starch, phosphate starch, nitrogen modified starch, starch crosslinked with aldehydes, epichlorohydrin, borates, and phosphates, and starches grafted with acrylonitrile, acrylamide, acrylic acid, methacrylic acid, maleic anhydride, or styrene. In an embodiment, the starch is present in the composition in an amount effective to prevent leak-off of the gel material. Effective amounts may be determined by one of ordinary skill in the art.

In an embodiment, the LPM comprises a water-soluble polymer with hydrophobic modification, referred to herein as a hydrophobically modified polymer. Hydrophobically modified polymers useful for the present disclosure may have molecular weights in the range of from about 100,000 to about 10,000,000. While these hydrophobically modified polymers have hydrophobic groups incorporated into the hydrophilic polymer structure, they should remain water-soluble. In some embodiments, a mole ratio of a hydrophilic monomer to the hydrophobic compound in the hydrophobically modified polymer is in the range of from about 99.98: 0.02 to about 90:10, wherein the hydrophilic monomer is a calculated amount present in the hydrophilic polymer. In certain embodiments, the hydrophobically modified polymers may comprise a polymer backbone that comprises polar heteroatoms. Generally, the polar heteroatoms present within the polymer backbone of the hydrophobically modified polymers include, but are not limited to, oxygen, nitrogen, sulfur, or phosphorous.

The hydrophobically modified polymers may be synthesized utilizing any suitable method. In one example, the hydrophobically modified polymers may be a reaction product of a hydrophilic polymer and a hydrophobic compound. In another example, the hydrophobically modified polymers may be prepared from a polymerization reaction comprising a hydrophilic monomer and a hydrophobically modified hydrophilic monomer. Those of ordinary skill in the art, with the benefit of this disclosure, will be able to determine other suitable methods for the synthesis of suitable hydrophobically modified polymers.

In certain embodiments, suitable hydrophobically modified polymers may be synthesized by the hydrophobic modification of a hydrophilic polymer. The hydrophilic polymers suitable for forming the hydrophobically modified polymers used in the present invention should be capable of reacting with hydrophobic compounds. Suitable hydrophilic polymers include, homo-, co-, or terpolymers such as, but not limited to, polyacrylamides, polyvinylamines, poly(vinylamines/vinyl alcohols), alkyl acrylate polymers in general, and derivatives thereof. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), and poly(methacrylic acid/dimethylaminopropyl methacrylamide). In certain embodiments, the hydrophilic polymers comprise a polymer backbone and reactive amino groups in the polymer backbone or as pendant groups, the reactive amino groups capable of reacting with hydrophobic compounds. In some embodiments, the hydrophilic polymers comprise dialkyl amino pendant groups. In some embodiments, the hydrophilic polymers comprise a dimethyl amino pendant group and a monomer comprising dimethylaminoethyl methacrylate or dimethylaminopropyl methacrylamide. In certain embodiments of the present invention, the hydrophilic polymers comprise a polymer backbone that comprises polar heteroatoms, wherein the polar heteroatoms present within the polymer backbone of the hydrophilic polymers include, but are not limited to, oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and derivatives thereof. In one embodiment, the starch is a cationic starch. A suitable cationic starch may be formed by reacting a starch, such as corn, maize, waxy maize, potato, and tapioca, and the like, with the reaction product of epichlorohydrin and trialkylamine.

The hydrophobic compounds that are capable of reacting with the hydrophilic polymers of the present invention include, but are not limited to, alkyl halides, sulfonates, sulfates, organic acids, and organic acid derivatives. Examples of suitable organic acids and derivatives thereof include, but are not limited to, octenyl succinic acid; dodecenyl succinic acid; and anhydrides, esters, imides, and amides of octenyl succinic acid or dodecenyl succinic acid. In certain embodiments, the hydrophobic compounds may have an alkyl chain length of from about 4 to about 22 carbons. In another embodiment, the hydrophobic compounds may have an alkyl chain length of from about 7 to about 22 carbons. In another embodiment, the hydrophobic compounds may have an alkyl chain length of from about 12 to about 18 carbons. For example, where the hydrophobic compound is an alkyl halide, the reaction between the hydrophobic compound and hydrophilic polymer may result in the quaternization of at least some of the hydrophilic polymer amino groups with an alkyl halide, wherein the alkyl chain length is from about 4 to about 22 carbons As discussed above and selected with regard to specific gel systems, water employed in the sealant compositions may be fresh water or salt water, e.g., an unsaturated aqueous salt solution or a saturated aqueous salt solution such as brine or seawater. The amount of water present in the disclosed sealant compositions is sufficient to form a pumpable slurry. In embodiments, the amount of water may be in a range of from about 25% to about 75% by weight of the sealant composition.

When appropriate, any suitable fluid loss control additives known in the art may be used, for example polymer fluid loss control additives, particulate fluid loss control additives, or combinations thereof. The fluid loss control additive may function to control loss of fluid, e.g., water, from the sealant composition. In an embodiment, the fluid loss control additive may comprise one or more starches such as those described herein. Such starches may be the same or different; used as an LPM as a fluid loss additive or both; and may be used alone or in combination with another LPM, fluid loss control additive, or both. Examples of suitable fluid loss control additives are disclosed in U.S. Pat. Nos. 5,340,860, 6,626, 992, 6,182,758, each of which is incorporated by reference herein in its entirety. In an embodiment, and in particular in an embodiment where the sealant composition comprises cement, the fluid loss control additives included in the sealant compositions are a copolymer of acrylamido-2-methylpropanesulfonate and N,N dimethylacrylamide, e.g., HALAD-344 fluid loss control additive also sold by Halliburton Energy Services, and a particulate matter such as silica flour, silica fume, sodium silicate, microfine sand, iron oxides, manganese oxides, barite, calcium carbonate, ground nut shells, ground wood, ground corncobs, mica, ceramics, ground tires, ground glass, ground drill cutting, etc., or mixtures of these. In an embodiment, and in particular in an embodiment where the sealant composition does not comprise cement, the fluid loss control additives included in the sealant composition may comprise, for example, natural and/or derivatized polysaccharides like galactomannan gums (guar gum, guar derivatives, etc), biopolymers, modified celluloses or combinations thereof in addition to or in lieu of the fluid loss control additives listed in the preceding sentence. The particulate matter preferably has a particle size between 0.5 and 150 microns. A suitable commercially available particulate matter is SSA-1 silica flour sold by Halliburton Energy Services. In embodiments comprising polymer fluid loss additives, particulate fluid loss additives, or combinations thereof, the amount of the particulate fluid loss additive in the sealant composition may be in the range from about 30 to about 70% by weight of the sealant composition and the amount of polymer fluid loss control additive present in the sealant composition may be in a range of from about 0.1% to about 3% by weight of the sealant composition.

Additional suitable fluid loss control additives are known in the art as superabsorbents, which are commonly used in absorbent products such as moisture retaining horticultural products, diapers, training pants, and feminine care products. Superabsorbents are swellable crosslinked polymers that have the ability to absorb and store many times their own weight of aqueous liquids by forming a gel. The superabsorbents retain the liquid that they absorb and typically do not release the liquid, even under pressure. Examples of superabsorbents include sodium acrylate-based polymers having three dimensional, network-like molecular structures. The polymer chains are formed by the reaction/joining of millions of identical units of acrylic acid monomer, which have been substantially neutralized with sodium hydroxide (caustic soda). Crosslinking chemicals tie the chains together to form a three-dimensional network, enabling the superabsorbents to absorb water or water-based solutions into the spaces in the molecular network, and thus forming a gel and locking up the liquid.

Still other examples of suitable fluid loss control additives comprise crosslinked polyacrylamide; crosslinked polyacrylate; crosslinked hydrolyzed polyacrylonitrile; salts of carboxyalkyl starch, for example, salts of carboxymethyl starch; salts of carboxyalkyl cellulose, for example, salts of carboxymethyl cellulose; salts of any crosslinked carboxyalkyl polysaccharide; crosslinked copolymers of acrylamide and acrylate monomers; starch grafted with acrylonitrile and acrylate monomers; crosslinked polymers of two or more of allylsulfonate, 2-acrylamido-2-methyl-1-propanesulfonic acid, 3-allyloxy-2-hydroxy-1-propane-sulfonic acid, acrylamide, and acrylic acid monomers; or combinations thereof.

In embodiments, the fluid loss control agent is a dehydrated, crystalline (i.e., solid) polymer. In a preferred embodiment, the crystalline polymer is a crosslinked polymer. In a more preferred embodiment, the crosslinked polymer is a crosslinked polyacrylamide in the form of a hard crystal. DIAMOND SEAL polymer is a suitable crosslinked polyacrylamide commercially available from Baroid Drilling Fluids, Inc., a Halliburton Company, Houston, Tex. The DIAMOND SEAL polymer is available in grind sizes of 1 mm, 4 mm, and 14 mm. The DIAMOND SEAL polymer possesses certain qualities that make it an exceptional swelling agent. For example, the DIAMOND SEAL polymer is water-insoluble and is resistant to deterioration by carbon dioxide, bacteria, and subterranean minerals. Further, the DIAMOND SEAL polymer can withstand temperatures up to at least 250° F. without experiencing breakdown and thus may be used in the majority of locations where oil reservoirs are found. WATER LOCK is a biodegradable starch backbone grafted with acrylonitrile and acrylate that is commercially available from Grain Processing Corporation of Muscantine, Iowa. Additional disclosure on superabsorbents may be found in U.S. patent application Ser. No. 10/967,121, filed Oct. 15, 2004 and entitled "Methods of Generating a Gas in a Plugging Composition to Improve its Sealing Ability in a Downhole Permeable Zone," which is incorporated by reference herein in its entirety. Other suitable fluid loss control additives are described in European Patent No. 0566118, which is incorporated by reference herein in its entirety.

The sealant compositions presented in the present disclosure may include one or more gel retarders. The amount of gel retarder present in the sealant composition may be in a range of from about 0% to about 5% by weight of the sealant composition. In an embodiment, the gel retarder may be an alkali metal carbonate such as sodium carbonate or a formate compound, e.g., water soluble formate, for contributing to the reduction in the gel time of the crosslinkable material as described in U.S. Published Application No. 2004/0035580, filed Jun. 5, 2002, and incorporated by reference herein in its entirety. The amount of the formate compound present in the sealant composition is in a range of from about 0% to about 5% by weight of the sealant composition. Examples of suitable water-soluble formates include ammonium formate, lithium formate, sodium formate, potassium formate, rubidium formate, cesium formate, francium formate, and combinations thereof.

Moreover, the sealant compositions may include a gel retarder as described in U.S. Published Application No. 2005/0288190, filed Jun. 24, 2004 and incorporated by reference herein in its entirety. In an embodiment, the gel retarder is comprised of a chemical compound that is capable of acetylating an organic amine and/or slowly hydrolyzing or thermolyzing to produce one or more acids in the sealant composition. The compounds retard the cross-linking of the sealant composition at high temperatures, i.e., temperatures above about 200° F., for a period of time sufficient to place the sealant composition in the subterranean formation or zone in which the permeability is to be reduced. Examples of gel retarder chemical compounds that is capable of acetylating an organic amine and/or slowly hydrolyzing or thermolyzing to produce one or more acids that can be utilized in accordance with the present invention include, but are not limited to, anhydrides such as acetic or propionic anhydride, esters such polylactate, amides such as proteins and polyamides, imides such as polysuccinimide, polyacids such as polyaspartic acid polyglutamic acids, and their salts. Of these, polysuccinimide or polyaspartic acid is preferred. Polysuccinimide hydrolyzes or thermolyzes in water to produce iminodisuccinic acid, polyaspartic acid or aspartic acid.

As deemed appropriate by one skilled in the art, additional additives may be added to the sealant compositions for improving or changing the properties thereof. Examples of such additives include but are not limited to set retarding agents, set accelerating agents, dispersing agents, strength retrogression control agents, viscosifying agents, and formation conditioning agents. The sealant compositions may further include a clay stabilizer for inhibiting damage to the subterranean formation during injection. The amount and type of clay stabilizer may be selected as deemed appropriate by one skilled in the art.

Methods of using the foregoing cement compositions first include preparing the compositions. They may be made by combining all of the components in any order and thoroughly mixing the components in a manner known to those skilled in the art. In an embodiment, one or more gel systems, are combined first, followed by the addition of the water, the particulate material (e.g. cement if any), optional fluid loss control additives and any other additives. In an embodiment, the cement compositions are prepared immediately prior to use to ensure that they do not form a gel before reaching permeable zones in the wellbore.

Subsequently, the foregoing sealant compositions may be placed in the permeable zones to improve the zonal isolation of a subterranean formation penetrated by the wellbore. As used herein, a permeable zone is defined as an area in the wellbore through which a fluid can undesirably flow, wherein the permeable zone may be present in a conduit disposed in the wellbore, a cement column disposed in the annulus of the wellbore between the conduit and the wall of the wellbore, a microannulus interposed between the cement column and the conduit, a microannulus interposed between the cement column and the wall of the wellbore, or combinations thereof.

Examples of such permeable zones include perforations such as those formed by a perforation gun, fissures, cracks, fractures, streaks, flow channels, voids, high permeability streaks, annular voids, or combinations thereof.

In an embodiment, a cement squeezing technique is employed to force a sealant composition into at least one permeable zone. As indicated previously, the sealant composition has a gel time greater than or equal to about 4 hours, for example, in a range of from about 4 hours to about 12 hours when it is exposed to ambient temperatures in a wellbore. Ambient downhole temperatures typically range from about 50° C. to about 175° C. As such, the composition remains pumpable for a sufficient amount of time to allow it to be squeezed into the permeable zone despite being exposed to relatively high temperatures. After placement in the permeable zone, the sealant composition is allowed to set into a rigid mass, thereby plugging the permeable zone such that fluids, e.g., water, most likely cannot pass through the permeable zone to the subterranean formation or vice-versa. Thus, the sealant composition effectively seals the subterranean formation from outside contaminants and/or prevents the influx of undesirable components from the formation into the wellbore.

EXAMPLES

The invention having been generally described, the following examples are given as particular embodiments of the invention and to demonstrate the practice and advantages thereof. It is understood that the examples are given by way of illustration and are not intended to limit the specification or the claims to follow in any manner.

Example 1

Figure 2:
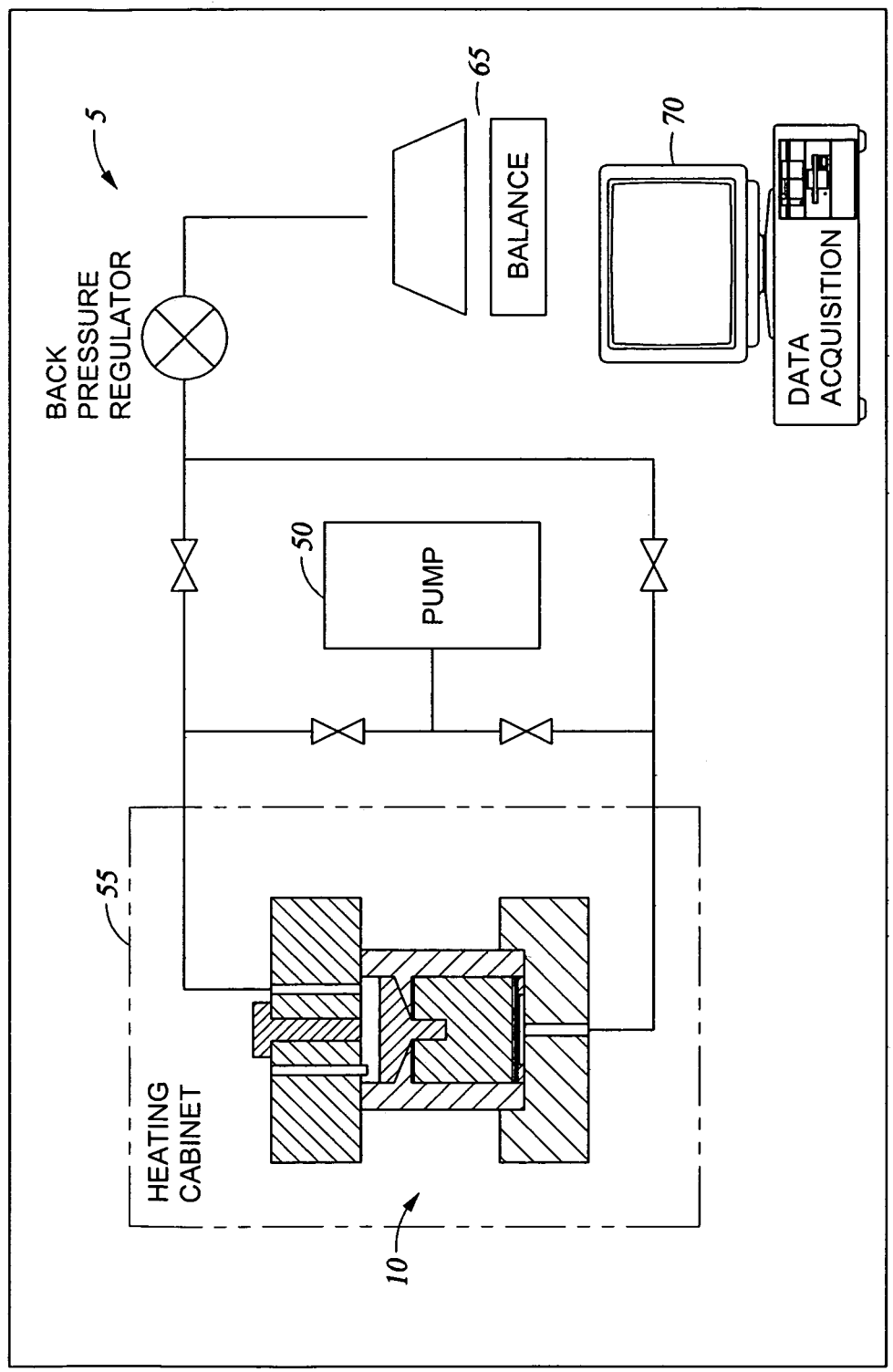
FIG. 2 is a schematic diagram of a sample test system incorporating the cell of FIG. 1.

The fluid leak off properties were measured in a custom built system 5 as depicted in FIGS. 1 and 2. The stainless steel cell 10 has a body 15 disposed between an upper housing 20 and a lower housing 25. The upper housing has a temperature sensor 22, a fill port 24, and a pressure port 27. The body 15 has a central chamber 30 holding a sample of core sample 32 on top of a metal filter 40. The core sample 32 simulates the permeability of a downhole formation. Rubber seals 45 provide a seal between the core sample 32 and the upper housing 20 and lower housing 25. A fluid reservoir 35 containing a sealant composition 37 and a liquid 39 is disposed above the core sample 32. The sealant composition 37 is placed in the reservoir 35 via fill port 24, followed by the liquid 39. The liquid 39 is pressurized via pressure port 27 using pump 50, as shown in FIG. 2. The steel cell 10 may be place in a heating cabinet 55, and the combination of heat and pressure provided by heating cabinet 55 and pump 50 may be used to simulate downhole conditions. Sealant composition 37 permeating the core sample 32 exits the steel cell 10 via exit port 60 in lower housing 25, and may be recovered an measured using balance 65. The system may be controlled and data acquired via computer 70.

Shut off properties of the sealant composition were measured using a system as depicted in FIGS. 1 and 2. The steel cell 10 was placed in a heating cabinet and could be operated at 130° C. and 200 bars. Fluid loss was measured on core sample 32, which was sandstone with a permeability in the range from 200-1000 mD. A small hole (8 mm ID) was drilled into the core sample to mimic a perforation. The cement slurry, i.e., sealant composition 37, conditioned at 80° C. was poured into the fill port 24 while the cell was at 80° C. Squeeze pressures of up to 80 bars were applied with a back pressure of 10 bars. Fluids were collected from the exit port 60 and fluid loss was recorded over time. API fluid loss (ml/30 minutes) was calculated by correcting for the area of the perforation.

In a controlled squeeze the fluid leak off penetrated the core approximately 2 cm. Subsequently the temperature of the heating cabinet was raised to the required value while maintaining an absolute pressure of 10 bars. The sealant was allowed to cure for 24 to 48 hours. After the cure pressure was stepwise increased from the back-side (reverse flow) and flow was monitored. Pressure was increased until maximum operating pressure of the set-up was reached (200 bars) or when pumps could not maintain pressure with the observed flow.

TABLE 1

| Component | | #1 | #2 | #3 |
|---|---|---|---|---|
| H$_2$Zero (in 2% KCl) | [w/w %] | 33.2% | — | 38.3% |
| Class 'G' cement | [w/w %] | 48.7% | 48.7% | 6.1% |
| SSA-1 | [w/w %] | 17.0% | 17.0% | 54.9% |
| Water | [w/w %] | — | 32.7% | — |
| KCl | [w/w %] | — | 0.7% | — |
| K-Formate | [w/w %] | 0.8% | 0.8% | — |
| HALAD-344 | [w/w %] | 0.3% | 0.3% | 0.46% |
| BayPure | [w/w %] | — | — | 0.19% |
| BHST | [° C.] | 130 | 130 | 130 |
| Squeeze pressure | [psi] | 1015 | 1015 | 1015 |
| Max. flowback pres. | [psi] | 2600 | 435 | 800 |

Example 2

Leakoff tests were performed at 120° F. using a Hassler sleeve apparatus containing a sandstone core. Brine containing 9% NaCl and 1% CaCl$_2$ was first pumped through the core to determine the initial permeability. In a control test, a mixture of 5% polyacrylamide and 1.3% polyethylene imine in fresh water was next pumped into the core. Approximately 140 mL of this mixture was pumped through the core in 20 minutes at a differential pressure of ~7 psi. This type of polymer solution offers essentially no resistance to flow through such cores. Thus, if the differential pressure had been increased, the same volume would have flowed through in a much shorter time period.

A second test utilized a mixture of 5% polyacrylamide and 1.3% polyethylene imine in fresh water, but also contained 50% by weight of 100 mesh sand. In this test a differential pressure of 1000 psi was applied, and only ~11 mL of fluid leaked off through the core in 30 minutes. Thus, the inert filler greatly limited the amount of fluid which entered the core. In both tests the core was shut in overnight to allow the polymer mixture to gel. Brine was flowed through the core the following day, and both tests gave greater than 99% reduction in permeability as compared to the original permeability of the core. Thus both solutions can greatly reduce the permeability of rock to water flow, but the mixture containing sand offers reduced fluid leak off.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A sealant composition for servicing a wellbore comprising at least one gel system, a loss prevention material and water, wherein the at least one gel system comprises a crosslinking agent and the crosslinking agent is polyethylene imine, wherein the loss prevention material comprises a particulate material, wherein the particulate material comprises silica flour.

2. The composition of claim 1 wherein the gel system further comprises one or more crosslinkable materials.

3. The composition of claim 1 wherein the gel system comprises a self-crosslinking material and an optional crosslinking agent.

4. The composition of claim 1 wherein the gel system comprises a partially polymerized furfuryl alcohol/aldehyde, a curing agent, a coupling agent and a diluent.

5. The composition of claim 1 wherein the gel system comprises a collodially stabilized latex.

6. The composition of claim 1 wherein the gel system comprises an alkali swellable latex and at least one pH increasing material.

7. The composition of claim 1 wherein the gel system comprises a flexible gel system wherein the flexible gel system comprises latexes, liquid rubbers, silicone oils or combinations thereof.

8. The composition of claim 1 wherein the gel system comprises a high-density aqueous salt solution, a water-soluble polymerizable monomer and a polymerization initiator.

9. The composition of claim 1 wherein the gel system further comprises water and a water-soluble polymer or mixture of polymers.

10. The composition of claim 1 wherein the gel system comprises a water-soluble polymer having acylated amine units which act as a crosslinker.

11. The composition of claim 1 wherein the gel system comprises water and a water-soluble polymer compound wherein the water-soluble polymer compound comprises polymerized vinyl amine units and an organic compound capable of crosslinking with the vinyl amine units of the water-soluble polymer.

12. The composition of claim 1 wherein the gel system comprises a water-soluble salt and an activator.

13. The composition of claim 1 wherein the gel system comprises a synthetic hectorite clay gelling and thixotropy-imparting agents.

14. The composition of claim 1 wherein the gel system further comprises an acrylamide polymer.

15. The composition of claim 1 wherein the particulate material further comprises sand, cement, gilsonite, graphite, fibrous materials, flaky materials, granular materials or combinations thereof.

16. The composition of claim 1 further comprising a fluid loss additive.

17. The composition of claim 1 wherein the cement is present in an amount of from about 1 wt. % to about 50 wt. % by weight of the sealant composition.

18. The composition of claim 1, wherein the loss prevention material further comprises a water-soluble material.

19. The composition of claim 18, wherein the water soluble material comprises a starch, a starch mixture, a pregelatinized starch, a chemically modified starch, a naturally occurring starch, a hydrophobically modified polymer, or combinations thereof.

* * * * *